(12) United States Patent
Ramachandra et al.

(10) Patent No.: US 12,507,122 B2
(45) Date of Patent: Dec. 23, 2025

(54) USER EQUIPMENT, RADIO NETWORK NODE AND METHODS FOR HANDLING DELAY IN DUAL CONNECTED MODE

(71) Applicant: Telefonaktiebolaget LM Ericsson (publ), Stockholm (SE)

(72) Inventors: Pradeepa Ramachandra, Linköping (SE); Sakib Bin Redhwan, Linköping (SE); Marco Belleschi, Solna (SE); Panagiotis Saltsidis, Stockholm (SE); Angelo Centonza, Granada (ES); Luca Lunardi, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 314 days.

(21) Appl. No.: 18/250,369

(22) PCT Filed: Oct. 20, 2021

(86) PCT No.: PCT/SE2021/051033
§ 371 (c)(1),
(2) Date: Apr. 25, 2023

(87) PCT Pub. No.: WO2022/093092
PCT Pub. Date: May 5, 2022

(65) Prior Publication Data
US 2024/0031868 A1    Jan. 25, 2024

Related U.S. Application Data

(60) Provisional application No. 63/105,374, filed on Oct. 26, 2020.

(51) Int. Cl.
*H04W 28/08* (2023.01)
*H04L 45/24* (2022.01)
(Continued)

(52) U.S. Cl.
CPC ....... *H04W 28/0958* (2020.05); *H04W 24/08* (2013.01); *H04W 28/06* (2013.01); *H04W 76/15* (2018.02)

(58) Field of Classification Search
CPC . H04W 28/0958; H04W 24/08; H04W 28/06; H04W 76/15; H04W 72/21;
(Continued)

(56) References Cited

U.S. PATENT DOCUMENTS 9,572,185 B2 * 2/2017 Sivanesan ............. H04W 40/24
11,297,619 B1 * 4/2022 Marupaduga ....... H04W 28/082
(Continued)

FOREIGN PATENT DOCUMENTS

WO    2017076826 A1    5/2017
WO    2018083653 A1    5/2018
(Continued)

OTHER PUBLICATIONS

"3GPP TS 38.314 V16.1.0", 3rd Generation Partnership Project; Technical Specification Group Radio Access Network; NR; Layer 2 Measurements; (Release 16), Sep. 2020, 1-18.
(Continued)

*Primary Examiner* — Harry H Kim
(74) *Attorney, Agent, or Firm* — Murphy, Bilak & Homiller, PLLC

(57) ABSTRACT

A method, performed by a User Equipment (UE) in dual connected mode is provided. The method is for determining and transmitting an UpLink (UL) Packet Data Convergence Protocol (PDCP) delay. The UE is connected to at least two radio network nodes. The UE determines (430) the delay. The determined delay is associated with each of the radio network nodes to which the UE is connected. The UE then transmits (450), to at least one of the radio network nodes, the determined delay.

12 Claims, 19 Drawing Sheets

(51) Int. Cl.

| | | |
|---|---|---|
| *H04L 47/28* | (2022.01) | |
| *H04W 24/08* | (2009.01) | |
| *H04W 24/10* | (2009.01) | |
| *H04W 28/00* | (2009.01) | |
| *H04W 28/02* | (2009.01) | |
| *H04W 28/06* | (2009.01) | |
| *H04W 72/21* | (2023.01) | |
| *H04W 76/15* | (2018.01) | |

(58) Field of Classification Search
CPC . H04W 28/00; H04W 28/0205; H04W 24/10; H04L 45/24; H04L 47/28
See application file for complete search history.

(56) References Cited

U.S. PATENT DOCUMENTS

| | | | |
|---|---|---|---|
| 2017/0048912 A1 | 2/2017 | Sharma et al. | |
| 2019/0007855 A1* | 1/2019 | Lee | H04W 28/0268 |
| 2022/0052956 A1* | 2/2022 | Hu | H04B 17/364 |
| 2022/0070721 A1* | 3/2022 | Jun | H04W 28/0278 |
| 2023/0209588 A1* | 6/2023 | Hoshino | G08G 1/096775 |
| | | | 370/329 |

FOREIGN PATENT DOCUMENTS

| | | | |
|---|---|---|---|
| WO | 2019193154 A1 | 10/2019 | |
| WO | 2019241973 A1 | 12/2019 | |
| WO | 2020034464 A1 | 2/2020 | |
| WO | 2021028040 A1 | 2/2021 | |
| WO | 2021159545 A1 | 8/2021 | |

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 V16.3.0, Sep. 2020, 83 pages.

"3rd Generation Partnership Project; Technical Specification Group Radio Access Network; NR; NR and NG-RAN Overall Description; Stage 2 (Release 16)", 3GPP TS 38.300 V16.1.0, Mar. 2020, 133 pages.

"3rd Generation Partnership Project; Technical Specification Group Radio Access Network; NR; Physical layer measurements (Release 16)", 3GPP TS 38.215 V16.1.0, Mar. 2020, 22 pages.

"3rd Generation Partnership Project; Technical Specification Group Services and System Aspects; Management and orchestration; 5G performance measurements (Release 16)", 3GPP TS 28.552 V16.1.0, Mar. 2019, 87 pages.

"Discussion on MDT enhancements", 3GPP TSG-RAN WG2 Meeting #111 electronic, R2-2007770, Huawei, HiSilicon, Online, Aug. 17-28, 2020, 7 pages.

"Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16)", 3rd Generation Partnership Project; Technical Specification Group Radio Access Network; 3GPP TS 37.320 V16.1.0, Jul. 2020, 33 pages.

3GPP, "3rd Generation Partnership Project; Technical Specification Group Radio Access Network; NG-RAN; Architecture description (Release 15)", 3GPP TS 38.401 V15.4.0, Dec. 2018, 1-40.

3GPP, "3rd Generation Partnership Project; Technical Specification Group Radio Access Network; NR; Physical layer procedures for control (Release 16)", 3GPP TS 38.213 V16.1.0, Mar. 2020, 1-156.

3GPP, "3rd Generation Partnership Project; Technical Specification Group Radio Access Network; NR; Radio Resource Control (RRC) protocol specification (Release 16)", 3GPP TS 38.321 V16.1.0, Jul. 2020, 1-151.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, 1-906.

3GPP, "3rd Generation Partnership Project; Technical Specification Group Services and System Aspects; System Architecture for the 5G System; Stage 2 (Release 16)", 3GPP TS 23.501 V16.1.0, Jun. 2019, pp. 1-368.

* cited by examiner

Method 400 in UE

Method 500 in radio network node

USER EQUIPMENT, RADIO NETWORK NODE AND METHODS FOR HANDLING DELAY IN DUAL CONNECTED MODE

TECHNICAL FIELD

Embodiments herein relate to a User Equipment (UE) in dual connected mode, and methods therein. In some aspects, they relate to determining and transmitting an UpLink (UL), Packet Data Convergence Protocol (PDCP) delay, wherein the UE is connected to at least two radio network nodes.

Embodiments herein further relate to a network node and methods therein. In some aspects, they relate to handling an UL PDCP delay between radio network nodes and a UE in dual connected mode, wherein the UE is connected to at least two radio network nodes.

Some embodiments herein relate to uplink packet data convergence protocol packet delay calculation and reporting in multi-radio access technology dual connectivity.

BACKGROUND

The background may also be referred to as Introduction.
5G Radio Access Network (RAN) Architecture
The current 5G RAN (NG-RAN) architecture is depicted and described in Technical Specification (TS) 38.401 v15.4.0 (http://www.3gpp.org/ftp//Specs/archive/38_series/38.401/38401-f40.zip).

FIG. 1 depicts an overall architecture of the Next Generation (NG). The NG architecture may be further described as follows. The NG-RAN consists of a set of gNBs connected to the 5G Core (5GC) through the NG. A gNB may support Frequency Division Duplex (FDD) mode, Time Division Duplex (TDD) mode or dual mode operation. gNBs may be interconnected through the Xn interface. A gNB may consist of a gNB-Central Unit (gNB-CU) and gNB-Distributed Units (gNB-DUs). A gNB-CU and a gNB-DU are connected via an F1 logical interface. One gNB-DU is connected to only one gNB-CU. For resiliency, a gNB-DU may be connected to multiple gNB-CU by appropriate implementation. NG, Xn and F1 are logical interfaces. The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signalling transport.

A gNB may also be connected to an LTE eNB via the X2 interface. Another architectural option is that where an LTE eNB connected to the Evolved Packet Core (EPC) network is connected over the X2 interface with a so called nr-gNB. The latter is a gNB not connected directly to a CN and connected via X2 to an eNB for the sole purpose of performing dual connectivity.

The architecture illustrated in FIG. 1 may be expanded by spitting the gNB-CU into two entities. One gNB-CU-UP, which serves the User Plane (UP) and hosts the Packet Data Convergence Protocol (PDCP) protocol and one gNB-CU-CP, which serves the Control Plane (CP) and hosts the PDCP and Radio Resource Control (RRC) protocol. For completeness, it should be said that a gNB-DU hosts the RLC/MAC/PHY protocols.

Immediate Minimization of Driving Test (MDT)

Immediate MDT is standardized so that management systems may collect Key Performance Indicators (KPIs) associated to a User Equipment (UE) in a connected mode.

The following excerpts from 3GPP TS 37.320 v16.1.0 provides some configuration and reporting of measurements in immediate MDT.

5.1.2 Immediate MDT Procedures
5.1.2.1 Measurement Configuration
For Immediate MDT, RAN measurements and UE measurements can be configured. The configuration for UE measurements is based on the existing RRC measurement procedures for configuration and reporting with some extensions for location information.

NOTE: No extensions related to time stamp are expected for Immediate MDT i.e. time stamp is expected to be provided by eNB/RNC/gNB.

If area scope is included in the MDT configuration provided to the RAN, the UE is configured with respective measurement when the UE is connected to a cell that is part of the configured area scope.

5.1.2.2 Measurement Reporting
For Immediate MDT, the UE provides detailed location information (e.g. GNSS location information) if available. The UE also provides available neighbour cell measurement information that may be used to determine the UE location (RF fingerprint). ECGI, Cell-Id, or CellIdentity of the serving cell when the measurement was taken is always assumed known in E-UTRAN, UTRAN or NR respectively.

The location information which comes with UE radio measurements for MDT can be correlated with other MDT measurements, e.g. RAN measurements. For MDT measurements where UE location information is provided separately, it is assumed that the correlation of location information and MDT measurements should be done in the TCE based on time-stamps.

5.4.1 RRC_CONNECTED
In RRC_CONNECTED state UE supports Immediate MDT as described in 5.1.2. In order to support Immediate MDT, the existing RRC measurement configuration and reporting procedures apply. Some extensions are used to carry location information.

5.4.1.1 Measurements and Reporting Triggers for Immediate MDT
Measurements to be performed for Immediate MDT purposes involve reporting triggers and criteria utilized for RRM. In addition, there are associated network performance measurements performed in the gNB.
In particular, the following measurements shall be supported for Immediate MDT performance:
Measurements:
  M1: DL signal quantities measurement results for the serving cell and for intra-frequency/Inter-frequency/inter-RAT neighbour cells, including cell/beam level measurement for NR cells only, TS 38.215 [19]
  M2: Power Headroom measurement by UE, TS 38.213 [20]
  M3: Void
  M4: PDCP SDU Data Volume measurement separately for DL and UL, per DRB per UE, see TS 28.552 [17]—M5: Average UE throughout measurement separately for DL and UL, per DRB per UE and per UE for the DL, per DRB per UE and per UE for the UL, by gNB, see TS 28.552 [17]
  M6: Packet Delay measurement separately for DL and UL, per DRB per UE, TS 28.552 [17] and TS 38.314 [18]
  M7: Packet loss rate measurement separately for DL and UL, per DRB per UE, TS 28.552 [17] and TS 38.314 [18]

M8: RSSI measurement by UE (for WLAN/Bluetooth measurement) see TS 38.331 [15].

M9: RTT Measurement by UE (for WLAN measurement) see TS 38.331 [15].

NOTE 1: M5~M7 do not apply to EN-DC SN terminated MCG/split bearers and MN terminated SCG/split bearers in Rel-16.

Measurement collection triggers:

For ML:
  Event-triggered measurement reports according to existing RRM configuration for events A1, A2, A3, A4, A5, A6, B1 or B2
  Periodic, A2 event-triggered, or A2 event triggered periodic measurement report according to MDT specific measurement configuration.

For M2:
  Reception of Power Headroom Report (PHR) according to existing RRM configuration.

NOTE 2: PHR is carried by MAC signalling. Thus, the existing mechanism of PHR transmission applies, see TS 38.321 [21].

For M3:
  End of measurement collection period

For M4:
  End of measurement collection period.

For M5:
  End of measurement collection period.

For M6:
  End of measurement collection period.

For M7:
  End of measurement collection period.

For M8:
  End of measurement collection period.

For M9:
  End of measurement collection period.

5.4.1.2 Radio Link Failure Report

The Radio Link Failure report contains information related to the latest connection failure experienced by the UE. The connection failure can be Radio Link Failure (RLF) or Handover Failure (HOF). The contents of the RLF report and the procedure for retrieving it by a gNB are specified in [TS 38.300].

NR RLF report content required for MDT includes:
  Latest radio measurement results of the serving and neighbouring cells, including SSB/CSI-RS index and associated measurements in the serving and neighbouring cells;
  NOTE: The measure quantities are sorted through the same RS type depending on the availability, according to the following priority: RSRP, RSRQ, SINR.
  WLAN and Bluetooth measurement results, if were configured prior RLF and are available for reporting;
  "No suitable cell is found" flag when T311 expires;
  Indication per SSB/CSI-RS beams reporting whether it is configured to RLM purpose;
  Available sensor information;
  Available detailed location information;
  RACH failure report (in case, the cause for RLF is random access problem or Beam Failure Recovery failure):
    Tried SSB index and number of Random Access Preambles transmitted for each tried SSB in chronological order of attempts;
    Contention detected as per RACH attempt;
    Indication whether the selected SSB is above or below the rsrp-ThresholdSSB threshold, as per RACH attempt;
    TAC of the cell in which the UE performs the RA procedure;
    Frequency location related information of the RA resources used by the UE as specified in TS 38.331 [15].
  If detailed location information (e.g. GNSS location information) is available the reported location information in rlfReport consists of:
    Latitude, longitude (mandatory);
    Altitude (conditional on availability);
    Velocity (conditional on availability);
    Uncertainty (conditional on availability);
    Confidence (conditional on availability);
    Direction (conditional on availability).

If sensor information is available, the sensor information may convey uncompensated barometric pressure, UE speed, and UE orientation. RLF reports may also include available WLAN measurement results and/or Bluetooth measurement results for calculating UE location.

In addition, the RLF report may include additional information required for MRO solutions, as specified in TS [TS 38.300].

5.4.1.3 Immediate MDT for MR-DC

Immediate MDT is supported for EN-DC scenario.

In signalling based immediate MDT, MME provides MDT configuration for both MN and SN towards MN including multi RAT SN configuration, specifically E-UTRA and NR MDT configuration. MN then forwards the NR MDT configuration towards SN (EN-DC scenario, SN is always NR).

In management-based immediate MDT, OAM provides the MDT configuration to both MN and SN independently. For both MN and SN, Management based MDT should not overwrite signalling based MDT For immediate MDT configuration, MN and SN can independently configure and receive measurement from the UE.

RAN Delay

The RAN internal delay may be split into multiple components and they are captured in 3GPP TS 38.314 specification. The following excerpts from TS 38.314 v16.1.0 provide some details of the components that make up the RAN delay.

4.2.1.2 Packet Delay 4.2.1.2.1 General

Packet delay includes RAN part of delay and CN part of delay.

The RAN part of DL packet delay measurement comprises:
  D1 (DL delay in over-the-air interface), referring to Average delay DL air-interface in TS 28.552 [2] 5.1.1.1.1.
  D2 (DL delay on gNB-DU), referring to Average delay in RLC sublayer of gNB-DU in TS 28.552 [2] 5.1.3.3.3.
  D3 (DL delay on F1-U), referring to Average delay on F1-U in TS 28.552 [2] 5.1.3.3.2.
  D4 (DL delay in CU-UP), referring to Average delay DL in CU-UP in TS 28.552 [2] 5.1.3.3.1.

The DL packet delay measurements, i.e. D1 (the DL delay in over-the-air interface), D2 (the DL delay in gNB-DU), D3 (the DL delay on F1-U) and D4 (the DL delay in CU-UP), should be measured per DRB per UE.

The RAN part (including UE) of UL packet delay measurement comprises:
  D1 (UL PDCP packet average delay, as defined in clause 4.3.1.1).
  D2.1 (average over-the-air interface packet delay, as defined in 4.2.1.2.2).
  D2.2 (average RLC packet delay, as defined in 4.2.1.2.3).

D2.3 (average delay UL on F1-U, it is measured using the same metric as the average delay DL on F1-U defined in TS 28.552 [2] clause 5.1.3.3.2).

D2.4 (average PDCP re-ordering delay, as defined in 4.2.1.2.4).

The UL packet delay measurements, i.e. D1 (UL PDCP packet average delay), D2.1 (average over-the-air interface packet delay), D2.2 (average RLC packet delay), D2.3 (average delay UL on F1-U) and D2.4 (average PDCP re-ordering delay), should be measured per DRB per UE. The unit of D1, D2.1, D2.2, D2.3 and D2.4 is 0.1 ms.

For non CU-DU split case, RAN part of packet delay excludes the delay at FI-U interface, i.e. D2.3 and D3.

For the QoS monitoring in TS 23.501 [4], RAN informs the RAN part of UL packet delay measurement, or the RAN part of DL packet delay measurement, or both to the CN.

4.3.1.1 UL PDCP Packet Average Delay Per DRB Per UE

The objective of this measurement performed by UE is to measure Packet Delay in Layer PDCP for QoS verification of MDT or for the QoS monitoring as defined in TS 23.501 [4].

Protocol Layer: PDCP

TABLE 4.3.1.1-1

Definition for UL PDCP Packet Average Delay per DRB per UE

| | |
|---|---|
| Definition | PDCP Packet Delay in the UL per DRB. This measurement refers to PDCP queuing delay for DRBs in the UE, which captures the delay from packet arrival at PDCP upper SAP until the UL grant to transmit the packet is available, which has included the delay the UE gets resources granted (from sending SR/RACH to get the first grant). The measurement is done separately per DRB.<br>Detailed Definition:<br><br>$$M(T, drbid) = \left[ \frac{\sum_{\forall i} tDeliv(i, drbid) - tArrival(i, drbid)}{I(T)} \right],$$<br><br>where explanations can be found in the table 4.3.1.1-2 below. |

NOTE:
UE measures UL PDCP queueing delay at DRB level. It is up to gNB to convert DRB level delay to QoS level delay with the assumption that all QoS flows mapped to the same DRB get the same QoS treatment, and it is up to gNB to calculate QoS level delay if multiple DRBs mapped with the same QoS.

TABLE 4.3.1.1-2

Parameter description for UL PDCP
Packet Average Delay per DRB per UE

| | |
|---|---|
| M(T, drbid) | PDCP average delay in the UL per DRB, averaged during time period T. Unit: 0.1 ms.<br>PDCP average delay in the UL per DRB is 1s if the actual value is larger than 1s. |
| tArrival(i) | The point in time when the PDCP SDU i arrivals at PDCP upper SAP. |
| tDeliv(i) | The point in time when the UL grant to transmit the PDCP SDU i is available. |
| i | A PDCP SDU that is received by the PDCP during time period T. |
| I(T) | Total number of PDCP SDUs i. |
| T | Time Period during which the measurement is performed |
| drbid | The identity of the measured DRB. |

Split Bearer Configuration

The following excerpts from 3GPP TS 37.340 v16.3.0 provide some details of the radio protocol architecture.

4.2.2 User Plane

In MR-DC, from a UE perspective, three bearer types exist: MCG bearer, SCG bearer and split bearer. These three bearer types are depicted in FIG. 4.2.2-1 for MR-DC with EPC (EN-DC) and in FIG. 4.2.2-2 for MR-DC with 5GC (NGEN-DC, NE-DC and NR-DC).

In E-UTRA connected to EPC, if the UE supports EN-DC, regardless whether EN-DC is configured or not, the network can configure either E-UTRA PDCP or NR PDCP for MN terminated MCG bearers while NR PDCP is always used for all other bearers. Change from E-UTRA to NR PDCP or vice-versa can be performed via a reconfiguration procedure (with or without handover), either using release and add of the DRBs or using the full configuration option.

In MR-DC with 5GC, NR PDCP is always used for all bearer types. In NGEN-DC, E-UTRA RLC/MAC is used in the MN while NR RLC/MAC is used in the SN. In NE-DC, NR RLC/MAC is used in the MN while E-UTRA RLC/MAC is used in the SN. In NR-DC, NR RLC/MAC is used in both MN and SN.

FIG. 2*a*. Illustrating FIG. 4.2.2-1: Radio Protocol Architecture for MCG, SCG and split bearers from a UE perspective in MR-DC with EPC (EN-DC)

FIG. 2*b*. Illustrating FIG. 4.2.2-2 Radio Protocol Architecture for MCG, SCG and split bearers from a UE perspective in MR-DC with 5GC (NGEN-DC, NE-DC and NR-DC).

From a network perspective, each bearer (MCG, SCG and split bearer) can be terminated either in MN or in SN. Network side protocol termination options are shown in FIG. 4.2.2-3 for MR-DC with EPC (EN-DC) and in FIG. 4.2.2-4 for MR-DC with 5GC (NGEN-DC, NE-DC and NR-DC).

NOTE 1: Even if only SCG bearers are configured for a UE, for SRB1 and SRB2 the logical channels are always configured at least in the MCG, i.e. this is still an MR-DC configuration and a PCell always exists.

NOTE 2: If only MCG bearers are configured for a UE, i.e. there is no SCG, this is still considered an MR-DC configuration, as long as at least one of the bearers is terminated in the SN.

FIG. 2*c*. Illustrating FIG. 4.2.2-3: Network side protocol termination options for MCG, SCG and split bearers in MR-DC with EPC (EN-DC).

FIG. 2*d*. Illustrating FIG. 4.2.2-4: Network side protocol termination options for MCG, SCG and split bearers in MR-DC with 5GC (NGEN-DC, NE-DC and NR-DC).

Currently there exist certain challenges. In the case of split bearer, UpLink (UL) packets may be sent only via a Master Node (MN), only via a Secondary Node (SN) or via both the MN and the SN (duplication or non-duplication). In such a scenario, the total RAN delay experienced by the packets depend on whether the packet was sent via the MN, via the SN or via both.

In a technical contribution, 3GPP R2-2007770, it was proposed that the UL delay may be calculated at the UE and sent to network using following three alternatives, or options.

Option 1: The UE reports a single D1 value to the node where it receives the measurement configuration.

Option 2: The MN and SN can independently configure the UE with D1 measurements in the split bearer. UE reports the D1 to each node respectively.

Option 3: Only the node hosting the PDCP entity configures the D1 measurement. The UE reports two D1s to the node hosting the PDCP entity in one RRC message.

SUMMARY

The summary may also be referred to as the Introduction.

As a part of developing embodiments herein the inventors identified a problem which first will be discussed.

The proposed options mentioned above, cover the UE responses adequately. However, some further optimizations may be required. A single D1 value may not be useful to the network without some additional information. On the other hand, as the UE has only one PDCP entity for the split bearer configuration, it is not straightforward for the UE to calculate two separate delay measurements without some further enhancements.

An object of embodiments herein may be to improve delay performance in MR-DC.

According to an aspect of embodiments herein, the object is achieved by a method, performed by a User Equipment, UE, in dual connected mode. The method is for determining and transmitting an UpLink, UL, Packet Data Convergence Protocol, PDCP, delay. The UE is connected to at least two radio network nodes. The UE determines the delay. The determined delay is associated with each of the radio network nodes to which the UE is connected. The UE then transmits, to at least one of the radio network nodes, the determined delay.

According to another aspect of embodiments herein, the object is achieved by a method, performed by a radio network node. The method is for handling an UpLink, UL, Packet Data Convergence Protocol, PDCP, delay between radio network nodes and a User Equipment, UE, in dual connected mode. The UE is connected to at least two radio network nodes. The radio network node receives at least one delay determined by the UE. The at least one received delay is associated with each of the radio network nodes to which the UE is connected. The radio network node obtains a percentage of packets received through each leg of the radio network nodes.

According to another aspect of embodiments herein, the object is achieved by a User Equipment, UE, adapted to be in dual connected mode, for determining and transmitting an UpLink, UL, Packet Data Convergence Protocol, PDCP, delay. The UE is connectable to at least two radio network nodes. The UE comprises a power supply circuitry configured to supply power to the UE, and a processing circuitry. The processing circuitry is configured to perform the steps of:

Determining the delay, wherein the determined delay is associated with each of the radio network nodes to which the UE is connected, and transmitting to at least one of the radio network nodes, the determined delay.

According to another aspect of embodiments herein, the object is achieved by a radio network node for handling an UpLink, UL, Packet Data Convergence Protocol, PDCP, delay between the radio network node and a User Equipment, UE, in dual connected mode. The UE is connectable to at least two radio network nodes. The radio network node comprises a power supply circuitry configured to supply power to the radio network node, and a processing circuitry. The processing circuitry is configured to perform the steps of:

Receiving (520) at least one delay determined by the UE, wherein the at least one received delay is associated with each of the radio network nodes to which the UE is connected, and obtaining (530) a percentage of packets received through each leg of the radio network nodes.

There are various embodiments provided herein, which address one or more of the issues disclosed herein. Certain aspects of the present disclosure and their embodiments may provide solutions to these or other challenges.

Certain embodiments may provide one or more of the following technical advantages. Embodiments herein such as the proposed solution allows a network to build a complete understanding of the delay situation of a dual connected UE while allowing for different UE implementations. It also outlines some changes in the UE implementation that may be necessary for the UE to comply with the requirements.

BRIEF DESCRIPTION OF THE DRAWINGS

Examples of embodiments herein are described in more detail with reference to attached drawings in which.

DETAILED DESCRIPTION

The Detailed description may also be referred to as Additional explanation.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
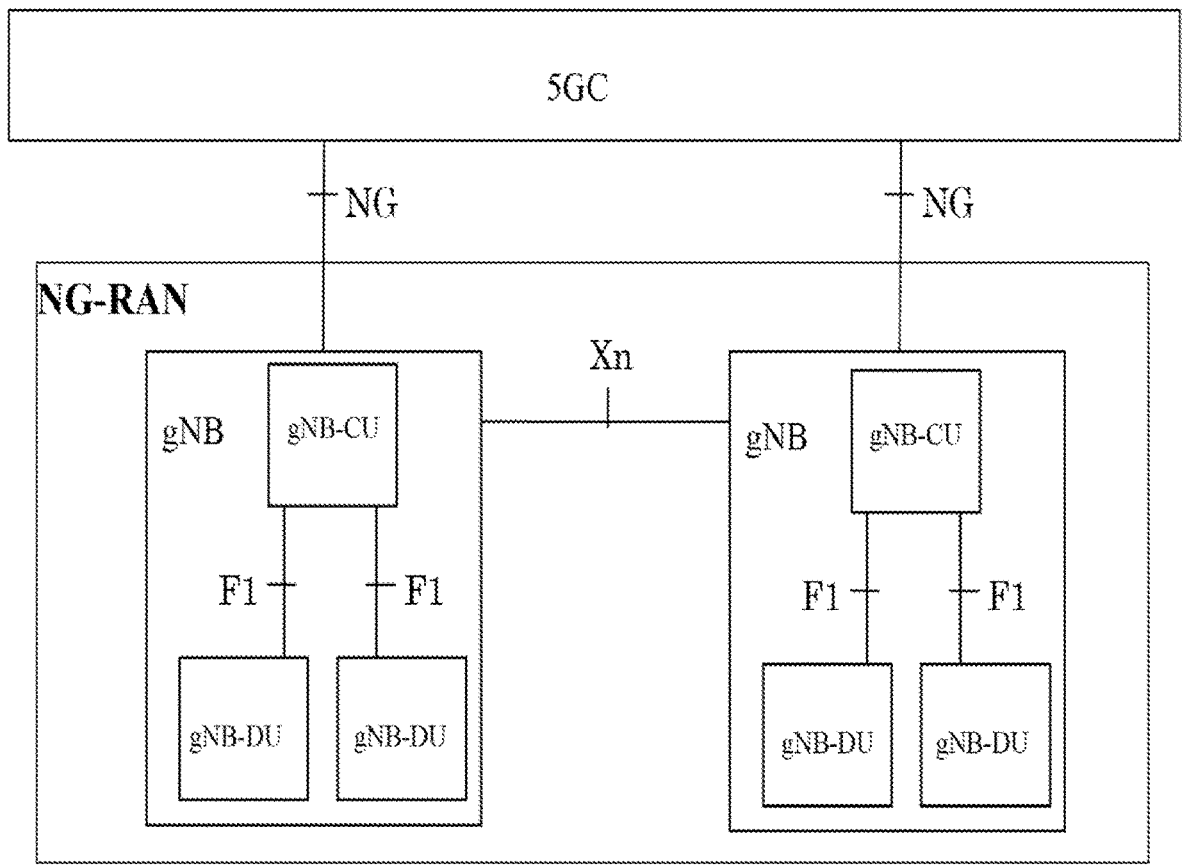
FIG. 1 is a schematic block diagram illustrating prior art.
Figure 2A:
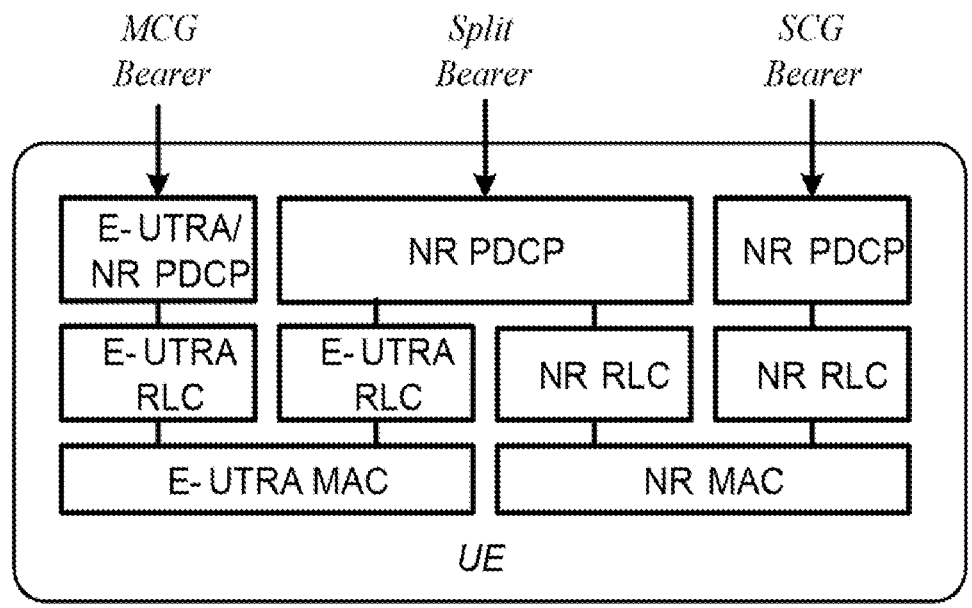
FIG. 2 *a, b, c, d* are schematic block diagrams illustrating prior art.
Figure 2B:
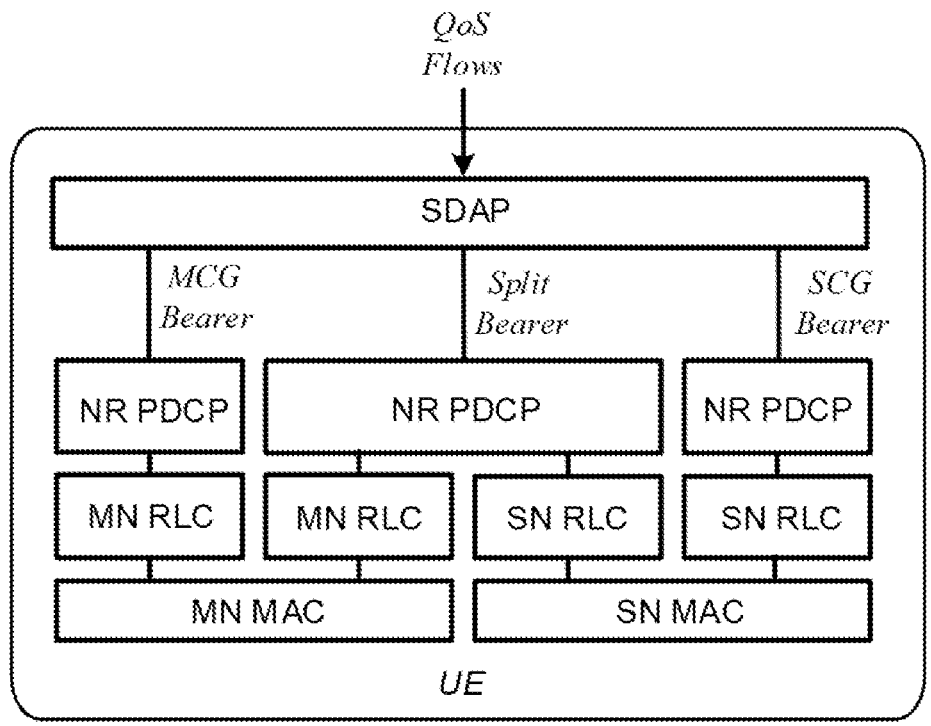
Figure 2C:
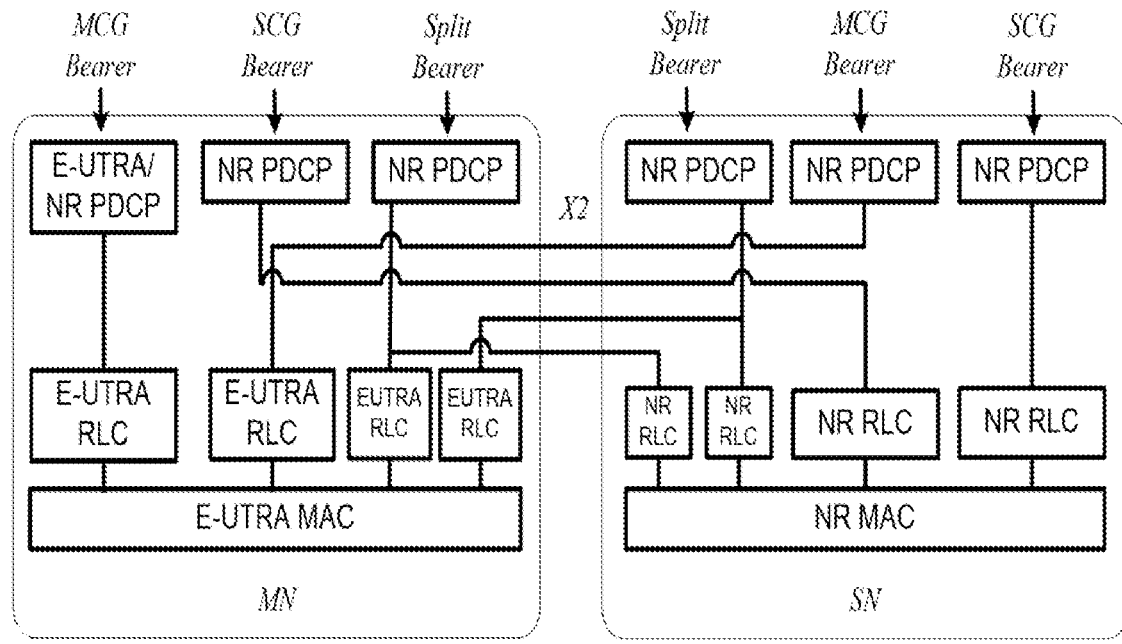
Figure 2D:
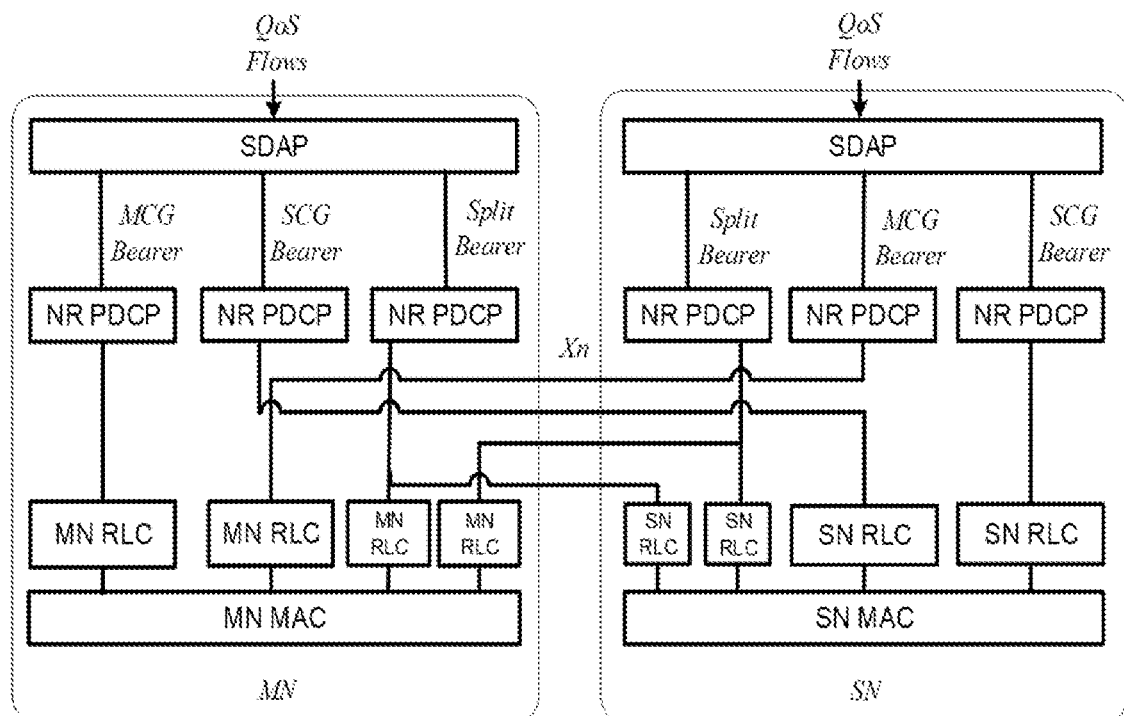
Figure 3:
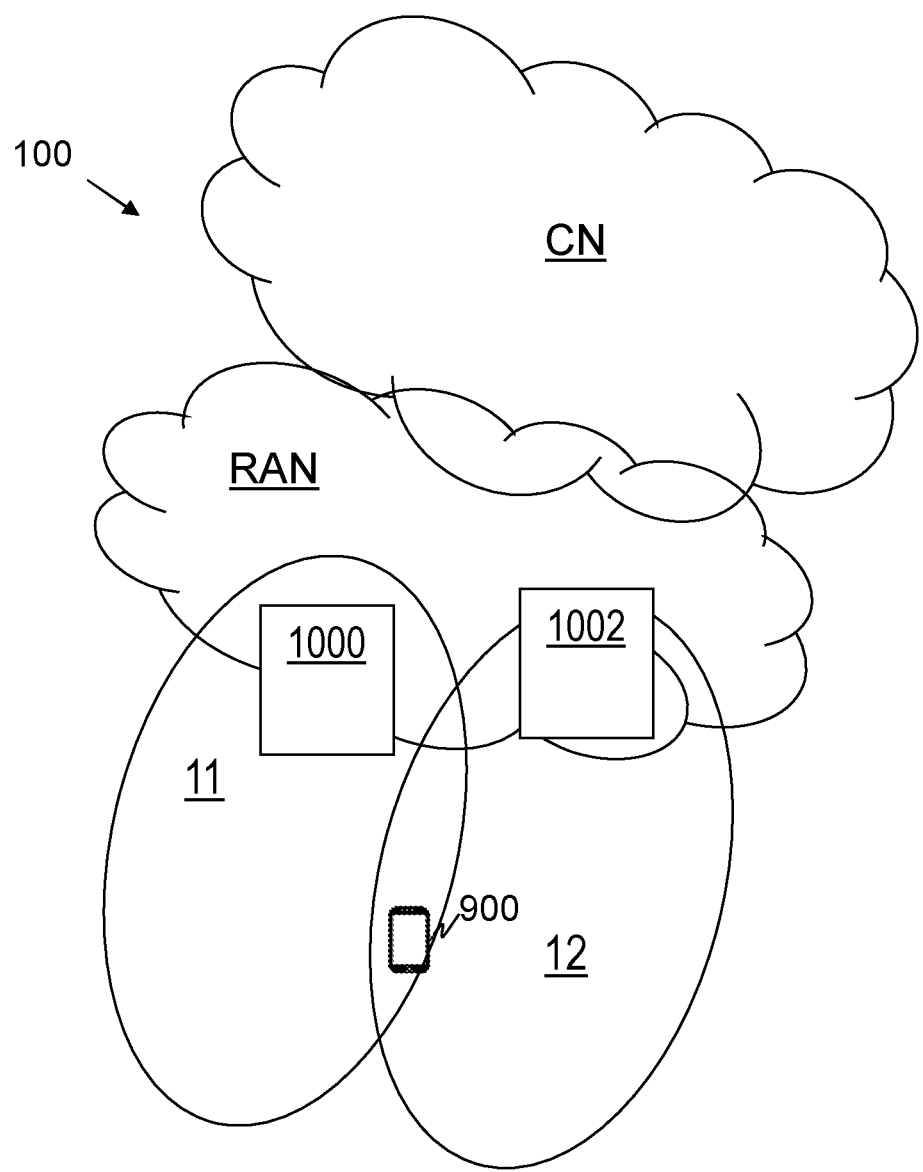
FIG. 3 is a schematic block diagram illustrating embodiments of a wireless network

FIG. 3 is a schematic overview depicting a wireless network 100 wherein embodiments herein may be implemented. The wireless network 100 comprises one or more radio access networks such as the RAN shown in FIG. 3, and one or more CNs.

A number of radio network nodes operate in the wireless network 100 such as e.g., a radio network node 1000. The radio network node 1000 provides radio coverage in one or more cells which may also be referred to as a service area, a beam or a beam group of beams, such as e.g. a cell 11. Further, another radio network node 1002 operate in the wireless network 100. The radio network node 1002 provides radio coverage in one or more cells, such as e.g. a cell 12. The radio network node 1000 may be referred to as a MN and the radio network node 1002 may be referred to as the SN. It may also be the other way around. The radio network node 1000 may be referred to as a SN and the radio network node 1002 may be referred to as the MN.

A number of UEs operate in the wireless communication network 100, such as e.g. a UE 900.

The present disclosure, such as embodiments herein, provide a compromised solution between the UE 900 and the network, such as the radio network nodes 1000, 1002 for calculating and reporting of determined UL PDCP delays, such as e.g. D1 measurements, associated with the radio network nodes 1000, 1002, to which the UE is connected. D1 measurements may e.g. mean determined UL PDCP delays, which determined UL PDCP delays may be associated with the radio network nodes 1000, 1002 to which the UE 900 is connected. In this disclosure, multiple scenarios are considered. These scenarios may comprise that the UE 900 calculates, also referred to as determines, only one D1 measurement value and that the UE 900 calculates two measurement values. When the UE 900 calculates two D1 measurement values, the UE 900 may receive a D1 measurement configuration from both the MN and the SN, such as the radio network node 1000 and the radio network node 1002, and report to each of them independently. When the UE 900 calculates only one D1 measurement value, the UE 900 may receive D1 measurement configuration from both the MN and the SN, such as the radio network node 1000 and the radio network node 1002, or the UE may receive D1 measurement configuration from either the MN or the SN, such as the radio network node 1000, or the radio network nodes 1002. See the below examples.

The UE 900 Determines Only One UL PDCP Delay Such as e.g. Calculates Only One D1 Measurement Value UE Receives D1 Measurement Configuration from Both MN and SN 1) The UE 900 calculates an average D1 measurement value for both the MN and the SN leg of the split-bearer configuration. The split-bearer configuration is a configuration for the radio bearers wherein both the master node such as e.g. the radio network node 1000 and the secondary node, such as e.g. the other radio network node 1002, may be used for data communication towards the UE in the dual connected mode. The MN and SN leg of the split-bearer configuration may mean the radio network nodes' 1000, 1002 connections to the UE 900 in the dual connected mode.
   a. The UE 900 keeps track of the packets sent in each leg and it may distinguish packets depending on the associated Radio Link Control (RLC) mode and if, and which, Robust Header Compression (ROHC) profile is applied.
2) The UE 900 reports the calculated same D1 value, e.g. the determined UL PDCP delay, to both MN and SN.
3) The UE 900 may also report the percentage of packets sent through each leg. This information allows the node receiving the D1 value, such as e.g. the radio network node 1000 and the radio network node 1002, to understand which of the MN or SN leg that was the strongest contributor to the overall delay. This measure may help e.g. in determining whether one of these legs needs to be removed because it may be the cause of the highest portion of packet delay. In such determination the UE 900 may, e.g. distinguish packets depending on the associated RLC mode and if, and which, ROHC profile is applied, which may indicate the presence of specific services.
4) The PDCP terminating entity on the network side (MN or SN) such as the radio network node 1000 or the radio network node 1002, also calculates the percentage of packet received through each leg, potentially distinguishing packets depending on the associated RLC mode and if, and which, ROHC profile is applied, and shares with the other entity (MN or SN) such as the radio network node 1000 or the radio network node 1002.

The UE 900 Receives D1 Measurement Configuration from Either MN or SN

1) The UE 900 calculates an average D1 measurement value for both the MN and the SN such as the radio network node 1000 and the radio network node 1002 legs of the split-bearer configuration.
   a. The UE 900 keeps track of the packets sent in each leg and it may distinguish packets depending on the associated RLC mode and if, and which, ROHC profile is applied.
2) The UE 900 reports the determined UL PDCP delay such as the calculated D1 value to only the configuring entity (the MN or the SN) such as the radio network node 1000 or the radio network node 1002.
3) The UE 900 may also report the percentage of packet sent through each leg. This information allows the node receiving the D1 value to understand which of the MN or SN leg that was the strongest contributor to the overall delay. This measure may help e.g. to determine whether one of these legs needs to be removed because it may be the cause of the highest portion of packet delay. In such determination the UE 900 may e.g. distinguish packets depending on the associated RLC mode and if, and which, ROHC profile is applied, which may indicate the presence of specific services.

4) The network node (MN or SN, such as the radio network node 1000 or the radio network node 1002) receiving the determined UL PDCP delay such as the D1 measurement value shares with the other network node (the other of the MN and the SN such as the other one of the radio network node 1000 and the radio network node 1002). If it is holding the PDCP entity (MN or SN terminated split-bearer), it may also calculate the percentage of the packets received from each leg, potentially distinguishing packets depending on the associated RLC mode and applied ROHC profile, and shares with the other network node. By sharing the information on the UL PDCP delay e.g. the D1 delay and portion of packets transmitted per leg by the UE 900, the sending network node enables the receiving network node to take decisions on whether to maintain both legs or to remove one of them in order to improve the delay performance.

The UE 900 Determines Two UL PDCP Delays Such as e.g. Calculates Two D1 Measurement Values UE 900 Receives D1 Measurement Configuration from Both MN and SN, and Reports to Each of them Independently 1) The network nodes such as the radio network nodes 1000, 1002 share the determined UL PDCP delay such as the D1 measurement values amongst themselves.
2) The network node holding the PDCP entity such as any of the radio network nodes 1000, 1002 may decide on the need for the split-bearer configuration and terminate it.

The present disclosure outlines methods used to calculate a single delay measurement for the UE 900 in dual connected mode and reporting them towards the network such as the radio network nodes 1000, 1002. It also introduces inter network nodes signals that enable the network to gather an understanding of the delay situation.

As previously described, the UE 900, may receive independent configurations from a MN and a SN to calculate delay measurements. This e.g. means that the UE 900, may receive independent configurations from the radio network node 1000, e.g. an MN and the radio network node 1000, e.g. an a SN, to determine delays. The MN and the SN such as the radio network nodes 1000, 1002 are interchangeably referred to as radio network nodes, network nodes and network entities herein. The present disclosure provides a compromised solution between the UE 900 and network such as the radio network nodes 1000, 1002 for determining and transmitting the determined UL PDCP delays such as e.g. calculating and reporting D1 measurements.

According to a first aspect of the present disclosure, there is provided a method implemented, or performed, by the UE 900 in dual connected mode, for determining and transmitting an UL PDCP delay. The UE is connected to at least two radio network nodes. The UE is connected to a MN and a SN.

Figure 4:
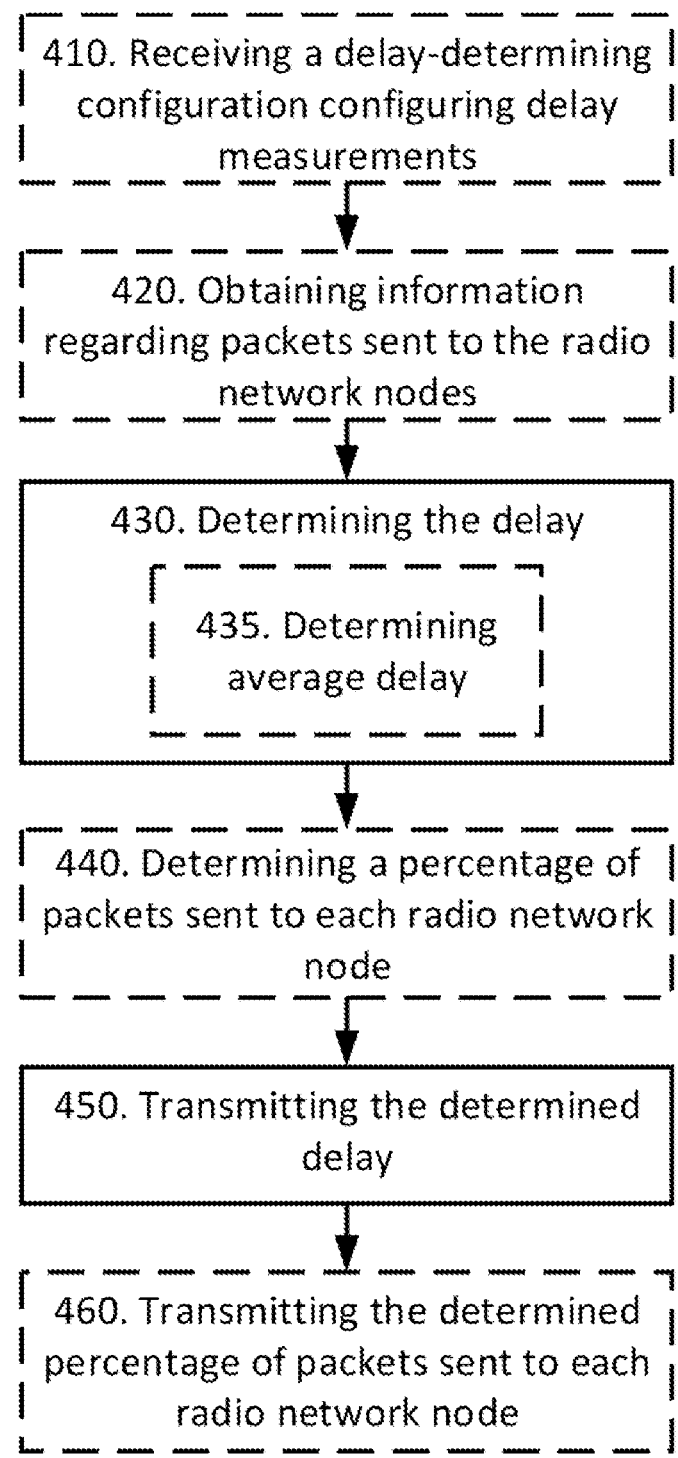
FIG. 4 is a flowchart depicting embodiments of a method in a UE.

Example embodiments of the method is now going to be described with reference to FIG. 4. FIG. 4 is a flowchart illustrating example embodiments of a method 400, performed by the UE 900 in dual connected mode. The method is for determining and transmitting an UL PDCP delay. Transmitting the UL PDCP delay may also be referred to as reporting the determined UL PDCP delay. The UE 900 is connected to at least two radio network nodes 1000, 1002.

The method 400 comprises the following steps, which steps may be taken in any suitable order. Optional steps are referred to as dashed boxes in FIG. 4.

Step 410

The UE 900 may in some embodiments receive a delay-determining configuration from at least one of the radio network nodes 1000, 1002 to which the UE 900 is connected. The delay-determining configuration configures delay measurements.

Step 420

The UE 900 may in some embodiments obtain information regarding packets sent to the radio network nodes 1000, 1002 to which the UE 900 is connected. This is useful since the delay experienced by these packets may vary if they are sent via the radio network node 1000, e.g., an MN node or via the radio network node 1002, e.g., an SN node. Therefore, the UE 900 may e.g. need to store this information to calculate the total average PDCP delay, D1, experienced by the packets sent over the MN such as the via the radio network node 1000, and the packets sent over SN such as the via the radio network node 1002. The obtained information may comprise at least one of:

A total fractional time duration of a measurement period while PDCP duplication was active, a total number of packets sent to each radio network node 1000, 10002 while PDCP duplication was active, a total fractional time duration of a measurement period while PDCP duplication was inactive, and a total number of packets sent to each radio network node 1000, 10002 while PDCP duplication was inactive.

The obtained information may comprise information related to an associated RLC mode and if, and which ROHC profile are being used for the packets. This may mean information related to an associated RLC mode and that information further is related to if a ROHC profile are being used for the packets, and in that case which ROHC profile that is used. This is advantageous since e.g., when an Acknowledged Mode (AM) based RLC mode is used then the RLC retransmissions may occur, while using Unacknowledged Mode (UM) based RLC mode then RLC retransmissions is not allowed and thus impacting the overall number of packets transmitted over the measurement interval.

Step 430

The UE 900 determines the delay, that is the UL PDCP delay. The determined delay is associated with each of the radio network nodes 1000, 1002 to which the UE 900 is connected. This may mean that a delay is determined for the UE connections to the network node 1000 and the network node 1002. The determined delay may be a D1 value.

The determined delay may be determined based on the obtained information regarding packets sent to the radio network nodes 1000, 1002.

Step 435. The determining of the delay may comprise determining an average delay for the at least two radio network nodes 1000, 1002 to which the UE 900 is connected.

Step 440

In some embodiments, the UE 900 determines a percentage of packets sent to each radio network node 1000, 1002 to which the UE 900 is connected. This enables the UE 900 to calculate the overall PDCP delay especially while different number of packets are sent over radio network node 1000 and radio network node 1002 and the associated PDCP delay experienced towards radio network node 1000 and radio network node 2000 are different.

The packets may be distinguished depending on an associated RLC mode and if, and which ROHC profile is applied. This may mean that the packets is distinguished depending on an associated RLC mode, and further, if a ROHC profile are applied for the packets, and in that case which ROHC profile that is applied.

This is useful since e.g., when the AM based RLC mode is used then the RLC retransmissions may occur while using the UM based RLC mode then RLC retransmissions is not allowed and thus impacting the overall number of packets transmitted over the measurement interval.

Step 450

The UE 900 transmits the determined delay, such as the UL PDCP delay, to at least one of the radio network nodes 1000, 1002. This may mean that UE 900 transmits information about the determined delay, e.g., referred to as the delay information. This may mean that the UE 900 is reporting the determined UL PDCP delay.

The determined delay may be transmitted to any one out of:

Each of the radio network nodes 1000, 1002 to which the UE 900 is connected, or one of the radio network nodes 1000, 1002 to which the UE 900 is connected.

Step 460

In some embodiments, the UE 900 transmits the determined percentage of packets sent to each radio network node 1000, 1002. This is transmitted to at least one of the radio network nodes 1000, 1002 to which the UE 900 is connected. This is useful when the network, such as the radio network nodes 1000, 1002, wants to compute the overall delay experienced by the UE 900 during the measurement period when the UE 900 has sent different number of packets towards the radio network node 1000 and the radio network node 1002.

The method 400 will now be described more in detail. Referring again to FIG. 4. The method 400 comprises step 430 of determining the delay. The determined delay is associated with each of the radio network nodes 1000, 1002 to which the UE 900 is connected. Thus, when the UE 900 is connected to a MN and SN, such as e.g. the network nodes 1000, 1002, the determined delay is associated with both the MN and the SN. In advantageous embodiments, the determined delay may be a D1 value, or a D1 measurement value.

The method 400 further comprises step 450 of transmitting, to at least one of the radio network nodes, the determined delay. Thus, the UE 900 may transmit the determined delay either to the MN, or the SN, such as e.g. the network node 1000 or the network node 1002, or to both nodes, such as e.g. the network node 1000 and the network node 1002. In case the determined delay is transmitted to both the MN and the SN, the same determined delay is transmitted to both radio network nodes 1000, 1002. The determined delay may be transmitted in a message. This may mean that information about the determined delay is transmitted, e.g. in the message.

In some embodiments, the method may further comprise determining a number of packets sent to each radio network node 1000, 1002 to which the UE 900 is connected. The method may further comprise step 440 of determining a percentage of packets sent to each radio network node 1000, 1002 to which the UE 900 is connected. The packets may, for example, be distinguished depending on an associated RLC mode and if, and which, ROHC profile is applied.

In some embodiments, the method further comprises step 460 of transmitting the determined percentage of packets sent to each radio network node 1000, 1002. This is transmitted to at least one of the radio network nodes 1000, 1002 to which the UE 900 is connected, i.e. at least one of the MN and the SN, such as e.g. at least one of the network node 1000 or the network node 1002. This information may be transmitted together with the determined delay, e.g. together with the information of the determined delay. Alternatively, the determined percentage may be transmitted in a separate message to the at least one radio network node. This information allows the radio network node 1000, 1002 receiving the determined delay to understand which of the MN or SN leg, such as e.g. the network node 1000 leg or the network node 1002 leg, that was the strongest contributor to the overall delay.

In some embodiments, the method 400 may further comprise step 420 of obtaining, e.g. gathering or collecting, information regarding packets sent to the radio network nodes 1000, 1002 to which the UE 900 is connected. The obtained information may comprise at least one of: a total fractional time duration of a measurement period while PDCP duplication was active; a total number of packets sent to each radio network node 1000, 1002 while PDCP duplication was active; a total fractional time duration of a measurement period while PDCP duplication was inactive; and a total number of packets sent to each radio network node 1000, 1002 while PDCP duplication was inactive. The obtained information may comprise information related to an associated RLC mode and if, and which, ROHC profile are being used for the packets. The determined delay may be determined based on the obtained information regarding packets sent to the radio network nodes.

In some embodiments, determining the delay comprises determining an average delay for the at least two radio network nodes 1000, 1002 to which the UE 900 is connected. Thus, the determined delay is an average delay for both the MN and the SN leg, such as e.g. the network node 1000 leg or the network node 1002 leg, of the split-bearer configuration. The average delay may be a weighted average delay. How the average delay may be determined is going to be described more in detail later.

In some embodiments, the method may further comprise step 410 of receiving a delay-determining configuration from at least one of the radio network nodes to which the UE 900 is connected. The delay-determining configuration configures delay measurements to the UE 900. Accordingly, the received delay-determining configuration may be a D1 measurement configuration, which may be received from the MN, the SN or from both the MN and the SN, such as e.g. from the network node 1000, the network node 1002 or from both the network node 1000 and the network node 1002. Different scenarios relating to this is going to be described more in detail later.

As previously described, the determined delay may be transmitted to each of the radio network nodes 1000, 1002 to which the UE 900 is connected, i.e. both the MN and the SN, such as both the network node 1000 and the network node 1002. Alternatively, the determined delay may be transmitted to one of the radio network nodes 1000, 1002 to which the UE 900 is connected, i.e. to one of the MN and the SN such as one of the network node 1000 and the network node 1002. Preferably, the determined delay may be transmitted to the radio network node 1000, 1002 from which the UE 900 received the delay-determining configuration.

According to a second aspect, there is provided a method performed, or implemented, by a radio network node 1000 for handling an UL PDCP delay between the radio network nodes 1000, 1002 and the UE 900 in dual connected mode. The UE 900 is connected to at least two radio network nodes 1000, 1002. The radio network node 1000 may be, for example, an MN or an SN.

Figure 5:
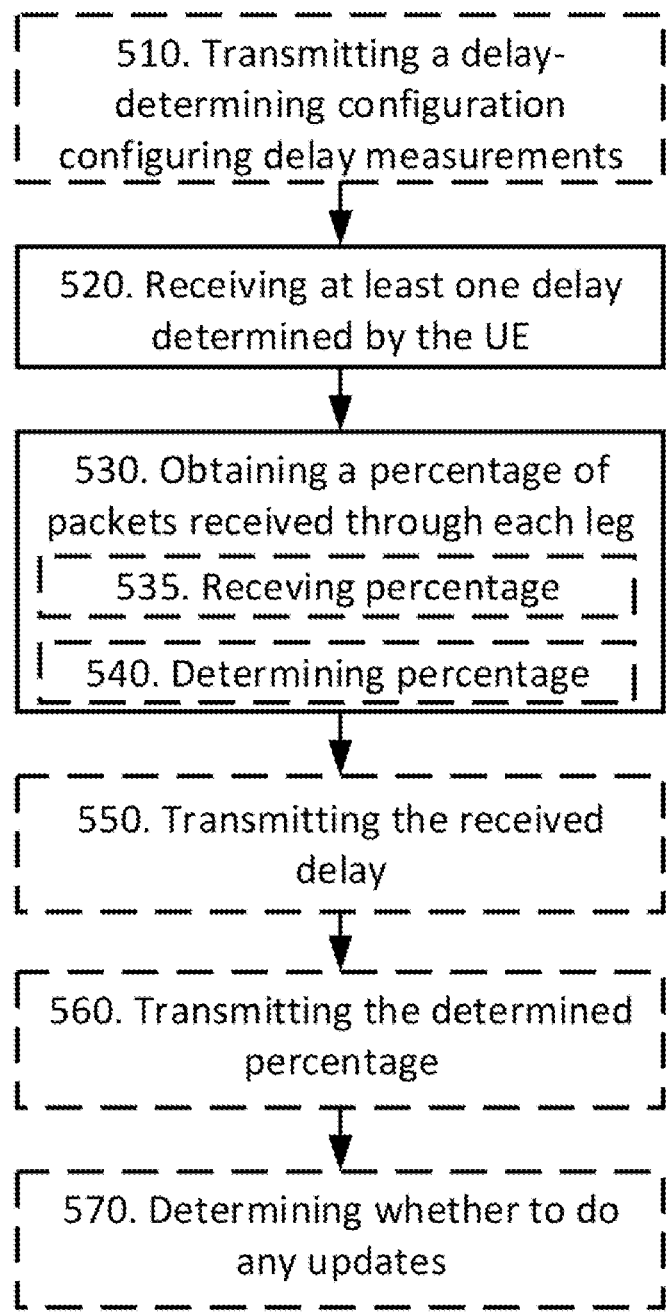
FIG. 5 is a flowchart depicting embodiments of a method in a radio network node

The method is now going to be described with reference to FIG. 5. FIG. 5 is a flowchart illustrating example embodiments of a method 500 performed by the radio network node 1000 for handling an UL PDCP delay between radio network nodes 1000, 1002 and a User Equipment, UE, 900 in dual connected mode. The UE 900 is connected to at least two radio network nodes 1000, 1002.

The method comprises the following steps, which steps may be taken in any suitable order. Optional steps are referred to as dashed boxes in FIG. 5.

Step 510

The radio network node 1000 may in some embodiments transmit a delay-determining configuration to the UE 900. The delay-determining configuration configures delay measurements.

Step 520

The radio network node 1000 receives at least one delay determined by the UE 900. The at least one received delay is associated with each of the radio network nodes 1000, 1002 to which the UE is connected. This may mean that network node 1000 receives information about the determined delay e.g., referred to as the delay information. The received at least one delay be referred to as a reported UL PDCP delay determined by the UE 900.

The received at least one delay determined by the UE 900 may e.g. be received from any one out of: the UE 900, or the other radio network node 1002 to which the UE 900 is connected.

The received at least one delay may be an average delay for the at least two radio network nodes 1000, 1002 to which the UE 900 is connected.

In some embodiments, the received at least one delay determined by the UE 900 is a D1 measurement value.

Step 530

The radio network node 1000 obtains a percentage of packets received through each leg of the radio network nodes 1000, 1002.

The obtaining of the percentage of packets received through each leg of the radio network nodes 1000, 1002 may e.g. comprises any one out of step 535 and step 540:

Step 535. The radio network node 1000 may receive, from the other radio network node 1002 to which the UE is connected, the percentage of packets received through each leg of the radio network nodes 1000, 1002.

Step 540. The radio network node 1000 may determine 540 the percentage of packets received through each leg of the radio network nodes 1000, 1002.

Step 550

In some embodiments, the radio network node 1000 transmits the received at least one delay determined by the UE 900. This is transmitted to the other radio network node 1002 to which the UE 900 is connected.

Step 560

The radio network node 1000 may transmit the determined percentage of packets received through each leg of the radio network nodes 1000, 1002. This may be transmitted to the other radio network node 1002 to which the UE 900 is connected, In some embodiments, the packets are distinguished depending on an associated RLC mode and if, and which ROHC profile is applied.

Step 570

In some embodiments, the radio network node 1000 determines whether to perform any updates regarding the legs. The legs may here refer to the connection between the UE 900 and the radio network node 1000 and the connection between the UE 900 and the radio network node 1002. This is determined based on the received at least one delay determined by the UE 900 and the obtained percentage of packets received through each leg.

The method 500 will now be described more in detail. Referring again to FIG. 5. The method 500 comprises step 520 of receiving at least one delay determined by the UE 900. Thus, the radio network node 1000 may receive at least one D1 measurement value. The received at least one determined delay is associated with each of the radio network nodes 1000, 1002 to which the UE 900 is connected. If the radio network node 1000 receives one determined delay, this received delay is associated with all of the radio network nodes 1000, 1002, e.g. an average delay, which will be further described. Thus, the received at least one delay is associated with both the SN and the MN, such as e.g. both the network node 1000 and the network node 1002. However, if the radio network node 1000 receives a plurality of determined delays, one of the received delays may relate to the radio network node 1000 itself and the others of the received delays may relate to the other radio network nodes 1002, which the UE 900 is connected to. Thus, if the network node 1000 is a MN, and the UE 900 further is connected to a SN, such as e.g. the network node 1002, the network node 1000 may receive one delay associated with the MN and one associated with the SN, such as e.g. one delay associated with the network node 1000 and one associated with the network node 1002. The received at least one determined delay may be comprised in a message.

If the network node 1000 receives one delay determined by the UE 900, the received delay may be received from the UE 900. Alternatively, received delay may be received from the other radio network node 1002 to which the UE 900 is connected. The received delay may be an average delay for the at least two radio network nodes 1000, 1002 to which the UE 900 is connected. The average delay may, for example, be a weighted average delay.

In case the radio network node 1000 receives a plurality of determined delays, it may receive one from the UE 900 and one from the other radio network node 1002 to which the UE 900 is connected. As previously described, one of the received delays may then be associated with the radio network node 1000 itself and the others of the received delays may be associated to the other radio network nodes 1002, which the UE 900 is connected to.

In some embodiments, the method may further comprise step 550 of transmitting, to the other radio network node 1002 to which the UE 900 is connected, the received delay determined by the UE 900. Whether the received delay is transmitted or not depends on the specific scenario. This is going to be further described later in the specification.

As illustrated in FIG. 5, the method further comprises step 530 of obtaining a percentage of packets received through each leg of the radio network nodes.

In some embodiments, the step 530 of obtaining the percentage of packets received through each leg of the radio network nodes 1000, 1002 may comprise step 535 of receiving, from the other radio network node 1002 to which the UE 900 is connected, the percentage of packets received through each leg of the radio network nodes 1000, 1002. In other embodiments, the step 530 of obtaining the percentage of packets received through each leg of the radio network nodes 1000, 1002 may comprise step 540 of determining the percentage of packets received through each leg of the radio network nodes 1000, 1002. If the radio network node 1000 determines the percentage of packets received through each leg, the method may further comprise step 560 transmitting, to the other radio network node 1002 to which the UE 900 is connected, the determined percentage of packets received through each leg of the radio network nodes 1000, 1002. By sharing the information on the delay and portion of packets transmitted per leg by the UE 900, the sending radio network node 1000 may enable the receiving radio network node 1002 to take decisions on whether to maintain both legs or to remove one of them in order to improve the delay performance.

In some embodiments, the packets are distinguished depending on an associated RLC mode and if, and which, ROHC profile is applied.

In some embodiments, the method further comprises step 570 of determining, based on the received delay determined by the UE 900 and the obtained percentage of packets received through each leg, whether to perform any updates regarding the leg. The network node 1000 may determine whether one of these legs may be removed because it may be the cause of the highest portion of packet delay. The radio network node 1000 may terminate the dual connectivity. Alternatively, the radio network node 1000 may adjust the PDCP duplication/non-duplication duration for the ongoing connectivity.

In some embodiments, the method may further comprise step 510 of transmitting a delay-determining configuration to the UE 900, wherein the delay-determining configuration configures delay measurements.

As previously described, in this disclosure multiple scenarios are considered. These scenarios comprise the scenario that the UE 900 calculates only one D1 measurement value and the scenario that the UE 900 calculates two measurement values. Embodiments according to these scenarios are now going to be described more in detail.

In the examples herein, the D1 measurement configuration may e.g. be referred to as the delay-determining configuration, and the D1 measurement may e.g. be referred to as the determining of the UL PDCP delay. Further, the MN and/or the SN may be referred to as the network node 1000 and/or the network node 1002.

The UE 900 Calculates a Single D1 Measurement Value

The scenario of the UE 900 calculating a single UE measurement value, such as determining the UL PDCP delay, e.g., comprises two different scenarios. One where the UE 900 may receive D1 measurement configuration from both the MN and the SN, and one where the UE may receive D1 measurement configuration from either the MN or the SN. E.g., one scenario where the UE 900 may receive the delay-determining configuration from both the network node 1000 and the network node 1002, and one where the UE may receive delay-determining configuration from either the network node 1000 or the network node 1002.

Figure 6:
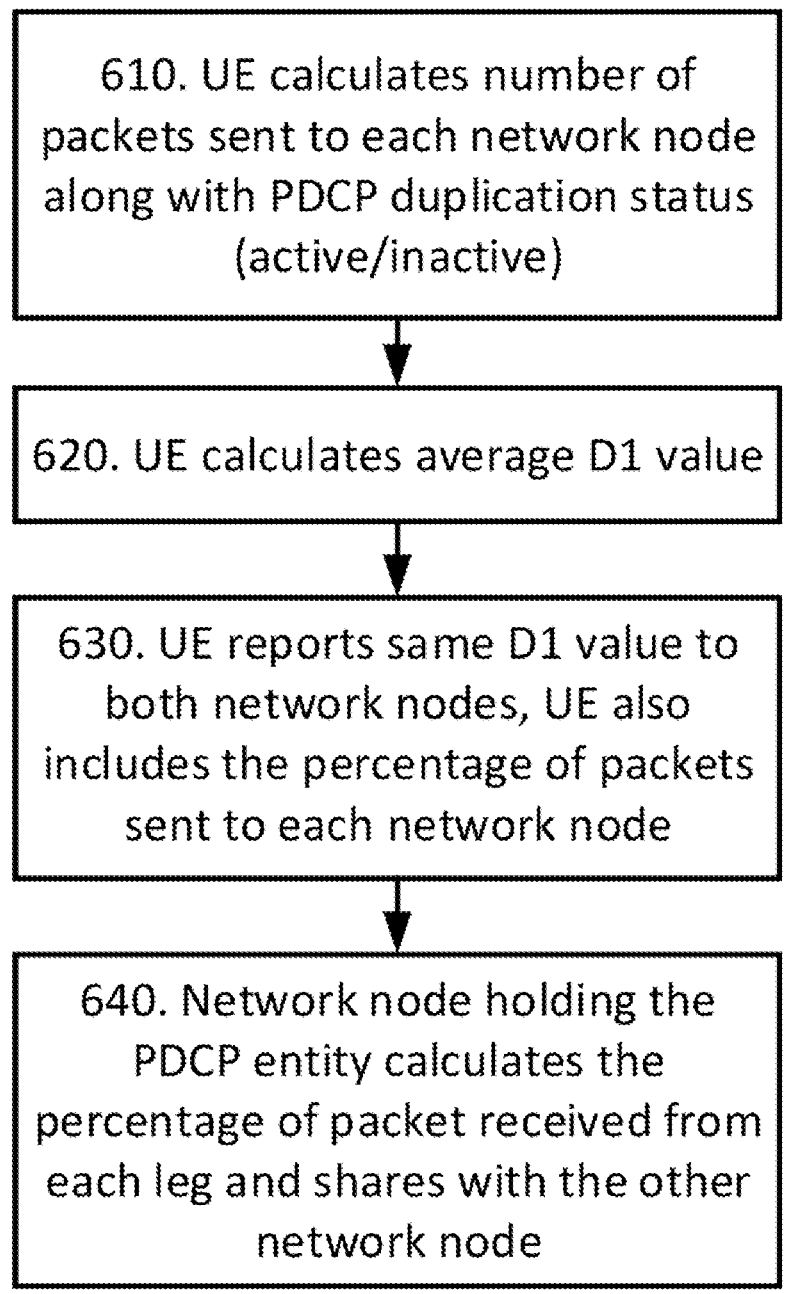
FIG. 6 is a flowchart depicting embodiments of a method.

The UE 900 Receives Configuration from Both Network Entities to Calculate D1 Values In some embodiments, the UE 900 may receive the delay-determining configuration, such as the D1 measurement configuration, from both network entities, such as the radio network nodes 1000, 1002, i.e., the MN and the SN. These example embodiments are now going to be described with reference to FIG. 6. In the embodiments of FIG. 6, it is illustrated that the UE 900 calculates average D1 delay measurement, wherein the UE 900 has received configuration from both network entities such as e.g. the network node 1000 and the network node 1002 to perform the measurement, such as determining the UL PDCP delay.

In FIG. 6, the UE 900 actions upon receiving D1 measurement configuration from both network entities, or network nodes, are shown. The D1 measurement configuration is also referred to as delay-determining configuration herein.

In step 610, the UE 900 obtains, such as e.g. collects, or gathers, information regarding packets sent to the network entities, such as e.g. the network node 1000 and/or the network node 1002. The relevant information the UE 900 gathers during this step may include:

1) Total fractional time duration of the measurement period while PDCP duplication was active.
2) Total number of packets sent to each network entity such as e.g. the network node 1000 and/or the network node 1002 during PDCP duplication was active.
3) Total fractional time duration of the measurement period while PDCP duplication was inactive.
4) Total number of packets sent to each network entity such as e.g. the network node 1000 and/or the network node 1002 during PDCP duplication was inactive. PDCP duplication may be active or inactive throughout different parts of the measurement duration. The UE 900 may gather some more pertinent information regarding the packets. Such information may be, for example, the associated RLC mode, and if, and which, ROHC profile are being used for them. This may be an indication of the service in use.

In step 620, the UE 900 determines and calculates a single D1 value for the bearer. The single D1 value for the bearer is a weighted average D1 value. Calculation of the weighted average may be done by using the information gathered and stored during step 510.

In one embodiment, the weighted average for the UL RAN delay is determined as follows.

$$\text{Average Delay} = \frac{N_{Dup} * D_{Best} + N_{NonDupMN} * D_{MN} + N_{NonDupSN} * D_{SN}}{N_{Dup} + N_{NonDupMN} + N_{NonDupSN}}$$

where,

| | |
|---|---|
| $N_{Dup}$ | The number of packets duplicated to both MN and SN during the measurement period. |
| $D_{Best}$ | The minimum of the average delay experienced on the MN and the average delay experienced on the SN i.e., $D_{Best} = \text{Min}(D_{MN}, D_{SN})$ |
| $N_{NonDupMN}$ | The number of packets sent to MN when the PDCP duplication is not enabled during the measurement period |
| $D_{MN}$ | The average delay experienced by the packets sent to the MN during the measurement period. |
| $N_{NonDupSN}$ | The number of packets sent to SN when the PDCP duplication is not enabled during the measurement period |
| $D_{SN}$ | The average delay experienced by the packets sent to the SN during the measurement period. |

In another embodiment, the weighted averaging for the DL RAN delay is determined as follows:

$$\text{Average Delay} = \frac{T_{Dup} * D_{Best} + T_{NonDup} * D_{Avg}}{T_{Dup} + T_{NonDup}}$$

where,

| | |
|---|---|
| $T_{Dup}$ | The time duration during which the packets were duplicated to both MN and SN during the measurement period. |
| $D_{Best}$ | The minimum of the average delay experienced to the MN and the average delay experienced to the SN i.e., $D_{Best} = \text{Min}(D_{MN}, D_{SN})$ |

| | |
|---|---|
| $T_{NonDup}$ | The time duration during which the packets were sent to MN or to the SN i.e., the PDCP duplication is not enabled during the measurement period |
| $D_{Avg}$ | The average delay experienced by the packets sent to the MN or SN during the measurement period. This average delay is performed as follows. |

$$D_{Avg} = \frac{N_{NonDupMN} * D_{MN} + N_{NonDupSN} * D_{SN}}{N_{NonDupMN} + N_{NonDupSN}}$$

| | |
|---|---|
| $N_{NonDupMN}$ | The number of packets sent to MN when the PDCP duplication is not enabled during the measurement period |
| $D_{MN}$ | The average delay experienced by the packets sent to the MN during the measurement period. |
| $N_{NonDupSN}$ | The number of packets sent to SN when the PDCP duplication is not enabled during the measurement period |
| $D_{SN}$ | The average delay experienced by the packets sent to the SN during the measurement period. |

In step 630, the UE 900 reports the determined D1 value to both radio network nodes 1000, 1002. The UE 900 may also send information regarding the percentage of the packets sent through each leg, i.e. the MN leg and the SN leg, such as e.g. the network node 1000 leg and the network node 1002 leg. The UE 900 may send the determined D1 value and the information regarding the percentage of the packets sent through each leg in same message. Alternatively, they may be sent in different messages.

In step 640, the PDCP terminating entity on the network side, meaning the MN or the SN, such as e.g. the network node 1000 or the network node 1002, also calculates the percentage of packet received through each leg. The PDCP terminating entity shares this information with the other entity, i.e. the other one of the MN and the SN such as e.g. the network node 1000 and the network node 1002.

Figure 7:
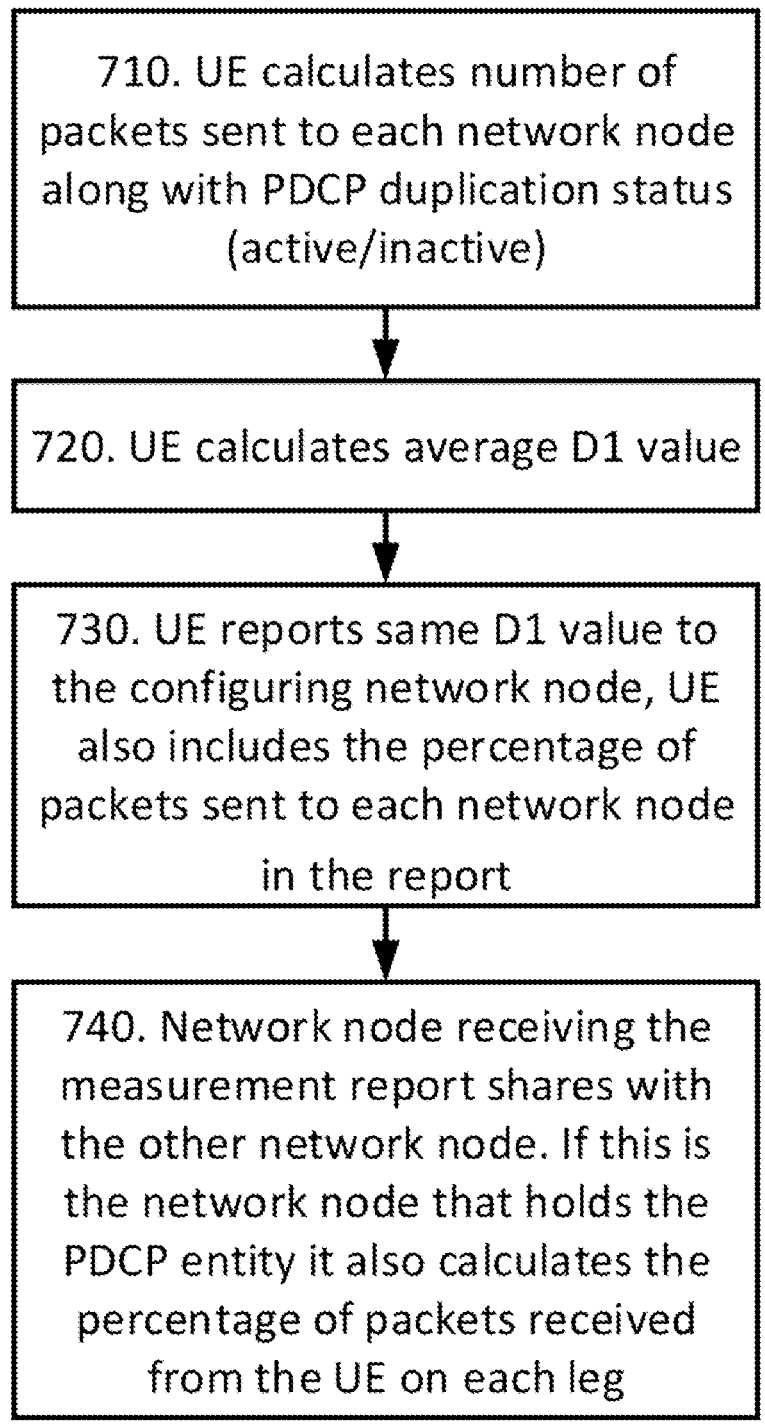
FIG. 7 is a flowchart depicting embodiments of a method.

The UE 900 Receives Configuration from One of the Network Entities to Calculate D1 Values In some embodiments, the UE 900 may receive a D1 measurement configuration from one of the network entities, or network nodes, i.e., the MN and the SN, such as the network node 1000 and the network node 1002, to calculate the D1 measurement. These embodiments are now going to be described with reference to FIG. 7. In the embodiments of FIG. 7, it is illustrated that the UE 900 calculates average D1 delay measurement, and that the UE 900 received configuration from one network node to perform the measurement.

In step 710, the UE 900 collects and gathers information regarding packets sent to each network node 1000, 1002. The relevant information the UE 900 gathers during this step may include:

1) Total fractional time duration of the measurement period while PDCP duplication was active.
2) Total number of packets sent to each network entity, such as e.g. the network node 1000 and the network node 1002, during PDCP duplication was active.
3) Total fractional time duration of the measurement period while PDCP duplication was inactive.
4) Total number of packets sent to each network entity, such as e.g. the network node 1000 and the network node 1002, during PDCP duplication was inactive. PDCP duplication may be active or inactive throughout different parts of the measurement duration. The UE 900 may gather some more pertinent information regarding the packets. Such information may be, for example, the associated RLC mode, and if, and which, ROHC profile are being used for them. This may be an indication of the service in use.

In step 720, the UE 900 calculates the average D1 delay. The UE 900 determines and calculates a single D1 value for the bearer. The single D1 value for the bearer is a weighted average D1 value. Calculation of the weighted average is done by using the information gathered and stored during step 710.

In one embodiment, the weighted average for the UL RAN delay is determined as follows.

$$\text{Average Delay} = \frac{N_{Dup} * D_{Best} + N_{NonDupMN} * D_{MN} + N_{NonDupSN} * D_{SN}}{N_{Dup} + N_{NonDupMN} + N_{NonDupSN}}$$

In another embodiment, the weighted averaging for the DL RAN delay is determined as follows:

$$\text{Average Delay} = \frac{T_{Dup} * D_{Best} + T_{NonDup} * D_{Avg}}{T_{Dup} + T_{NonDup}}$$

In step 730, the UE 900 sends the delay information to the configuring entity, i.e. the configuring network node. The UE also sends information regarding the percentage of the packets sent through each leg, such as e.g. the network node 1000 leg and the network node 1002 leg. The UE 900 may send this information in same message as the delay information or it may be sent in a different message.

In step 740, the radio network node 1000, 1002 receiving the measurement report shares the report with the other radio network node. It also calculates the percentage of the packets received from UE 900 on each leg and shares with the other network element.

This information may be sent in a single message or multiple messages between the network entities.

UE Calculates Different D1 Values for Each of the Entities

Figure 8:
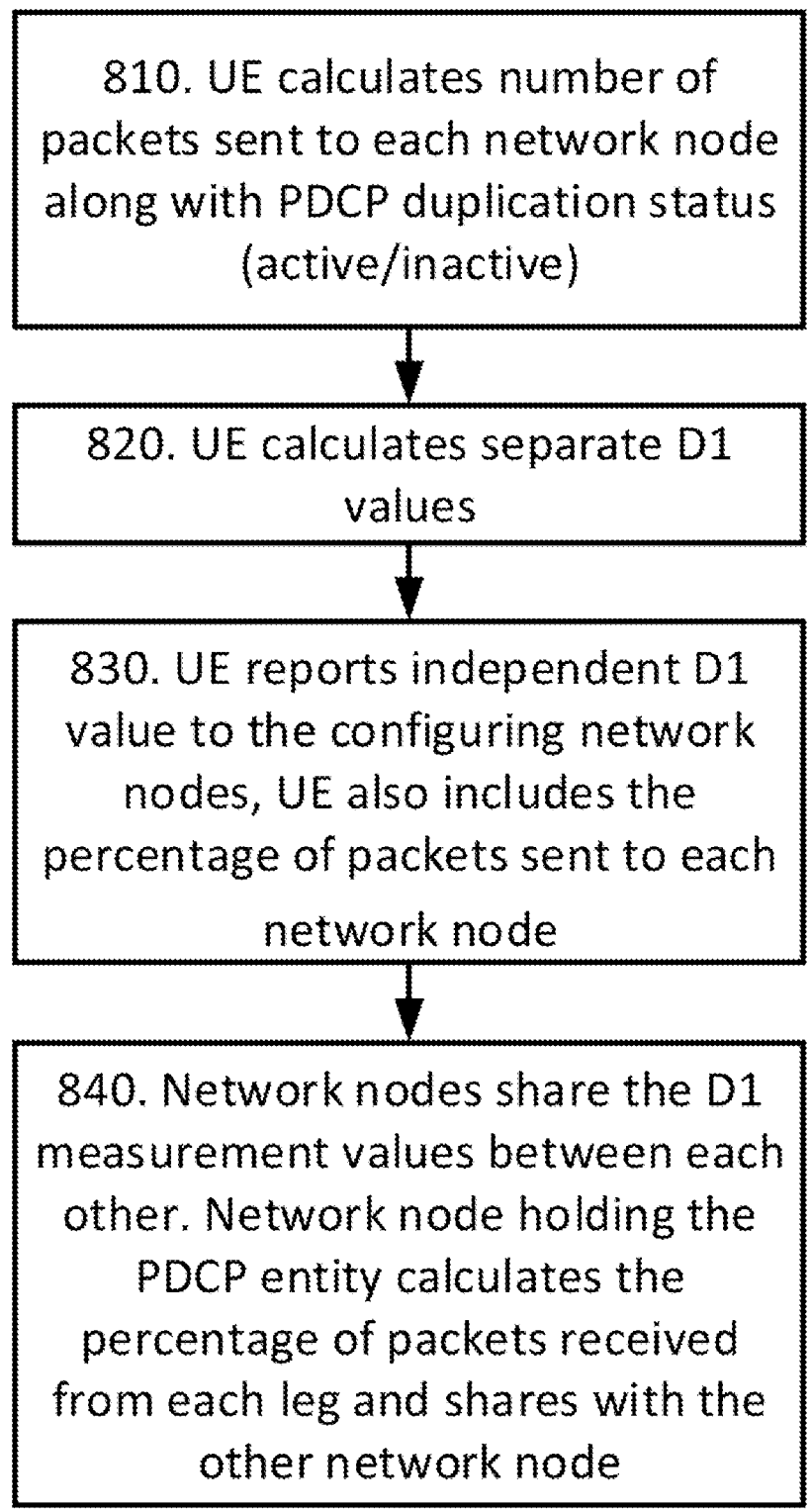
FIG. 8 is a flowchart depicting embodiments of a method.

According to other scenario of the present disclosure, the UE calculates separate D1 values for each of the MN and the SN such as e.g. the network node 1000 and the network node 1002. The embodiments within this scenario are now going to be described with reference to FIG. 8. In the embodiments of FIG. 8, the UE 900 performs individual D1 measurements. In FIG. 8, the UE actions for calculating multiple D1 values are outlined.

In step 810, the UE 900 collects and gathers information regarding packets sent to each network entity such as e.g. the network node 1000 and the network node 1002. The relevant information the UE 900 gathers during this step may include:

1) Total fractional time duration of the measurement period while PDCP duplication was active.
2) Total number of packets sent to each network entity, such as e.g. the network node 1000 and the network node 1002, during PDCP duplication was active.
3) Total fractional time duration of the measurement period while PDCP duplication was inactive.
4) Total number of packets sent to each network entity, such as e.g. the network node 1000 and the network node 1002 during PDCP duplication was inactive. PDCP duplication may be active or inactive throughout different parts of the measurement duration. The UE 900 may gather some more pertinent information regarding the packets. Such information may be, for example, the associated RLC mode, and if, and which, ROHC profile are being used for them. This may be an indication of the service in use.

In step 820 and 830, the UE determines, or calculates, separate D1 measurement values for each of the MN and SN leg, such as e.g. the network node 1000 leg and the network node 1002 leg, and sends to the respective network node 1000, 1002.

In one embodiment, the UE 900 includes the percentage of the packets sent to each network node along with the delay measurement report. Alternatively, the UE may send this in a separate message.

In step 840, the network entities, such as e.g. the network node 1000 and the network node 1002, share the D1 measurement values amongst themselves, i.e. they share the D1 measurement values between each other. The network node holding the PDCP entity, calculates the percentage of packets received through each leg and shares this information to the other network node.

The network such as e.g. the network node 1000, may utilize the information received from the UE 900 to optimize and/or modify the UE connectivity as follows:

The network, such as e.g. the network node 1000, may terminate the dual connectivity.

The network, such as e.g. the network node 1000, may adjust the PDCP duplication and/or non-duplication duration for the ongoing connectivity.

If a different treatment is done at PDCP layer for different services or traffic types, e.g. User Datagram Protocol (UDP) vs Transmission Control Protocol (TCP), e.g. reflected in associated RLC mode and ROHC profile in use, the network, such as e.g. the network node 1000, may use this information, i.e. the shared D1 measurement values, to terminate the dual connectivity or adjust the PDCP duplication and/or non-duplication duration for the ongoing connectivity.

According to a third aspect of the present disclosure, there is provided the UE 900 in dual connected mode configured to perform the method 400 according to the first aspect. The UE 900 is connected to at least two radio network nodes, such as e.g. the network node 1000, and the network node 1002. Example embodiments are illustrated in FIGS. 9a and 9b reproduced herein below.

Figure 9A:
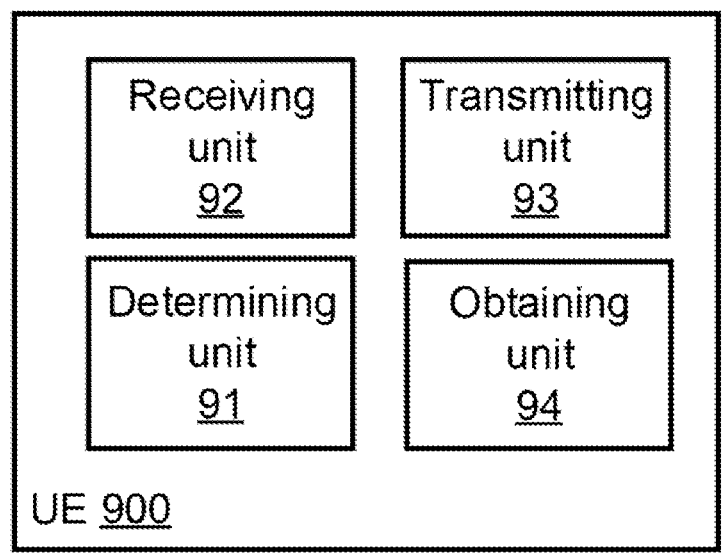
FIGS. 9 *a* and *b* are schematic block diagrams illustrating embodiments of a UE.

FIG. 9a depicts a schematic drawing illustrating an example of a user equipment, such as e.g. the UE 900. According to some embodiments, the UE 900 may comprise a determining unit 91, a receiving unit 92, a transmitting unit 93 and an obtaining unit 94 configured to perform the method 400.

Figure 9B:
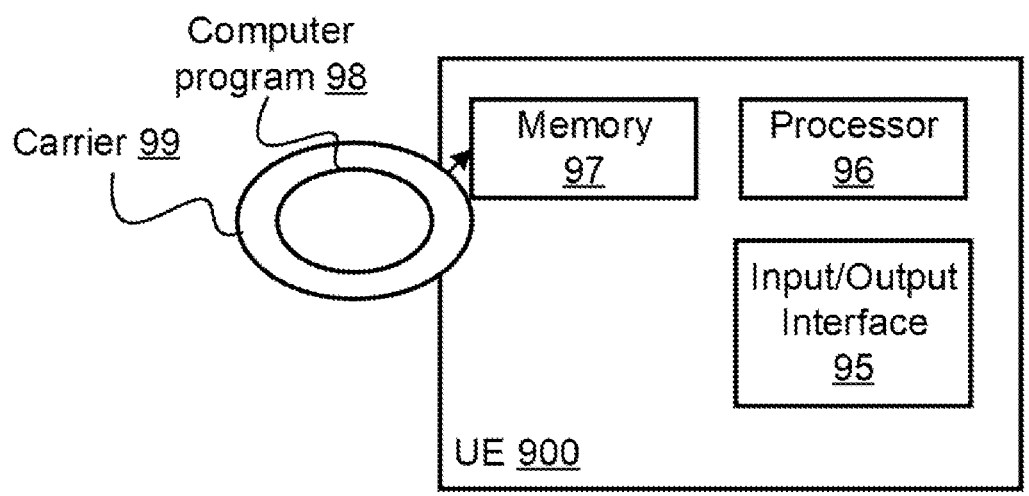

FIG. 9b is a Schematic drawing illustrating an example of a user equipment such as e.g. the UE 900. According to other embodiments, the UE 900 may comprise a processor 96 and a memory 97. The memory 97 may store computer program code which, when run in the processor 96 may cause the UE 900 to perform the method 400 according to the previously presented aspect.

According to a fifth aspect of the present disclosure, there is provided a computer program 98 comprising instructions, which when executed by a processor, such as the processor 96, causes the processor 96 to perform actions according to the methods 400 according to the first aspect.

According to the sixth aspect of the present disclosure, there is provided a carrier 99 comprising the computer program 98 of the fifth aspect, wherein the carrier 99 is one of an electronic signal, an optical signal, an electromagnetic signal, a magnetic signal, an electric signal, a radio signal, a microwave signal, or a computer-readable storage medium.

The UE is 900 configured to determining and transmitting an UL PDCP delay. The UE 900 is configured to determine the delay. The determined delay is associated with each of the radio network nodes, such as e.g. the network node 1000, and the network node 1002, to which the UE 900 is connected. The UE 900 is further configured to transmit, to at least one of the radio network nodes, such as e.g. the network node 1000 or the network node 1002, the determined delay.

According to a fourth aspect of the present disclosure, there is provided the radio network node 1000 configured to perform the method 500 according to the second aspect. The UE 900 is connected to at least two radio network nodes such as e.g. the network node 1000 and the network node 1002. Example embodiments are illustrated in FIGS. 10a and 10b.

Figure 10A:
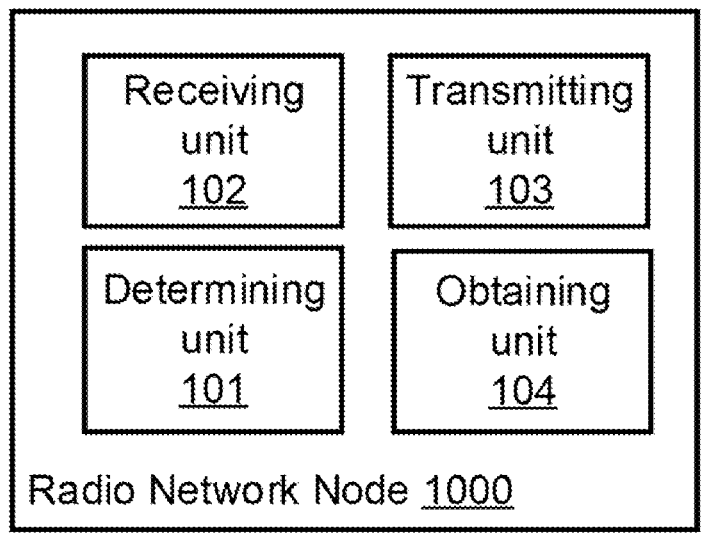
FIGS. 10 *a* and *b* are schematic block diagrams illustrating embodiments of a radio network node.

FIG. 10a is a schematic drawing illustrating an example of a radio network node, such as e.g. the network node 1000. According to some embodiments, the radio network node 1000 may comprise a determining unit 101, a receiving unit 102, a transmitting unit 103 and an obtaining unit 104 configured to perform the method 500.

Figure 10B:
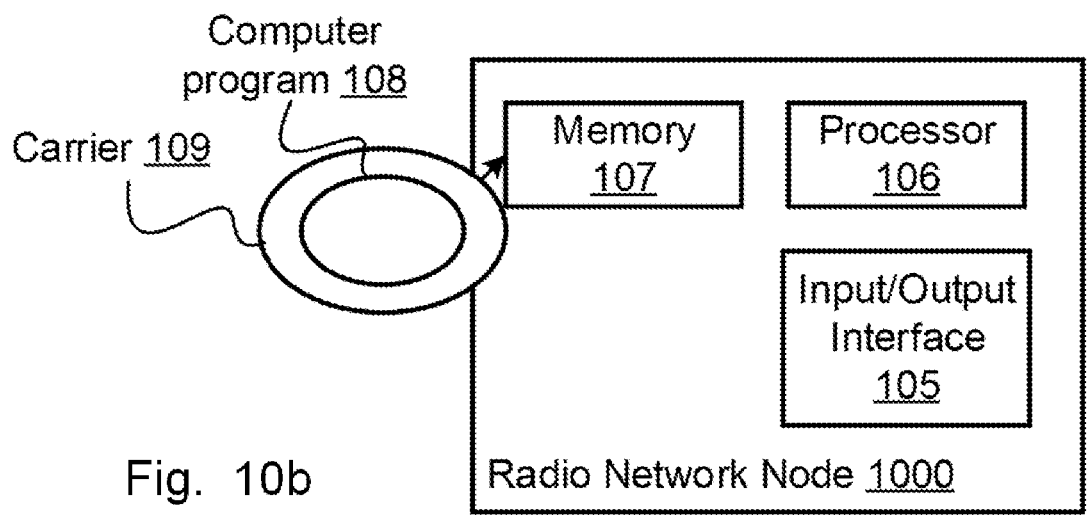

FIG. 10b is a schematic drawing illustrating an example of a radio network node, such as e.g. the network node 1000. According to some embodiments, the radio network node 1000 may comprise a processor 106 and a memory 107. The memory 107 may store computer program code which, when run in the processor 106 may cause the radio network node 1000 to perform the method 500 according to the previously presented aspect.

According to the fifth aspect of the present disclosure, there is further provided a computer program 108 comprising instructions, which when executed by a processor, such as the processor 106, causes the processor to perform actions according to any of the methods according to the second aspect.

According to the sixth aspect of the present disclosure, the object is achieved by a carrier 109 comprising the computer program 108 of the fifth aspect, wherein the carrier 109 is one of an electronic signal, an optical signal, an electromagnetic signal, a magnetic signal, an electric signal, a radio signal, a microwave signal, or a computer-readable storage medium.

The radio network node 1000 is configured to handle an UL PDCP delay between the radio network node 1000 and a UE 900 in dual connected mode. The radio network node 1000 is configured to receive the delay, which is determined by the UE 900. The determined delay is associated with each of the radio network nodes, such as e.g. the network node 1000, and the network node 1002, to which the UE 900 is connected. The radio network node 1000 is further configured to obtain a percentage of packets received through each leg of the radio network nodes.

Accordingly, the present disclosure outlines methods used to calculate a single delay measurement for a UE, such as the UE 900, in dual connected mode and reporting them towards network, such as e.g. the network node 1000, and the network node 1002. It also introduces inter network entity signals that enables the network, such as e.g. the network node 1000, and the network node 1002, to gather an understanding of the delay situation. Thus, the present disclosure provides a solution that allows the network, such as e.g. the network node 1000, and the network node 1002 to build a complete understanding of the delay situation of a dual connected UE 900 while allowing for different UE implementations. It also outlines some changes in the UE implementation that may be necessary for the UE 900 to comply with the requirements.

Figure 11:
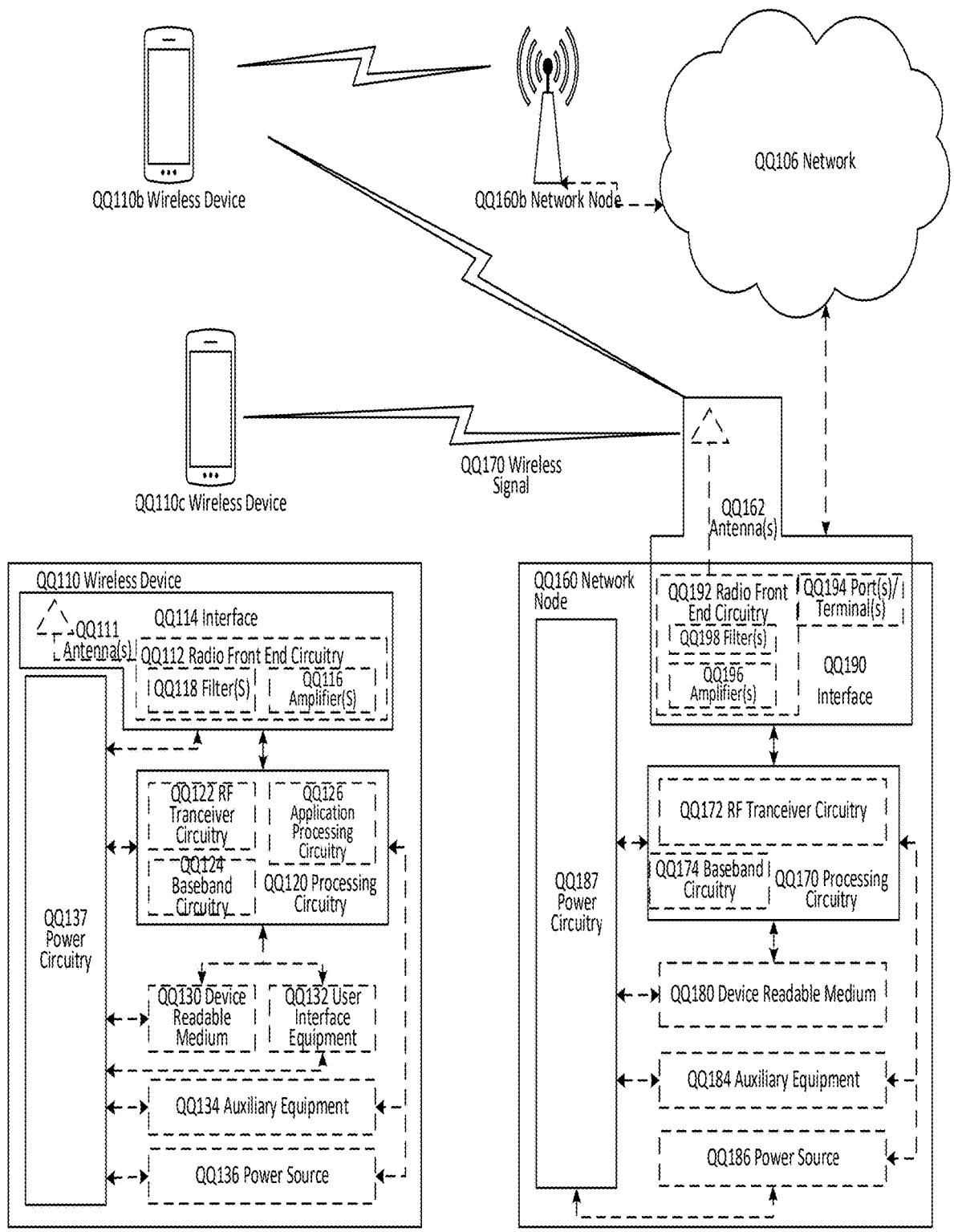
FIG. 11 schematically illustrates embodiments of a telecommunication network connected via an intermediate network to a host computer.

FIG. 11. A Wireless Network in Accordance with Some Embodiments

Although the subject matter described herein may be implemented in any appropriate type of system using any suitable components, the embodiments disclosed herein are described in relation to a wireless network, such as the example wireless network illustrated in FIG. 11 or e.g. the example wireless network 100. For simplicity, the wireless network of FIG. 11 only depicts network QQ106, network nodes QQ160 and QQ160*b*, and WDs QQ110, QQ110*b*, and QQ110*c*. In practice, a wireless network may further include any additional elements suitable to support communication between wireless devices, such as e.g. the UE 900, or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network. The network nodes QQ160 and QQ160*b* may be configured to perform the method of the network node according to the present disclosure. The wireless device QQ110, QQ110*b* and QQ110*c* may be configured to perform the method as illustrated in FIG. 4. The network node QQ160 and QQ160*b* may be configured to perform the method as illustrated in FIG. 5.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node, such as e.g. radio network node 1000, 1002, refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, Wi-Fi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. QQ1 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 12:
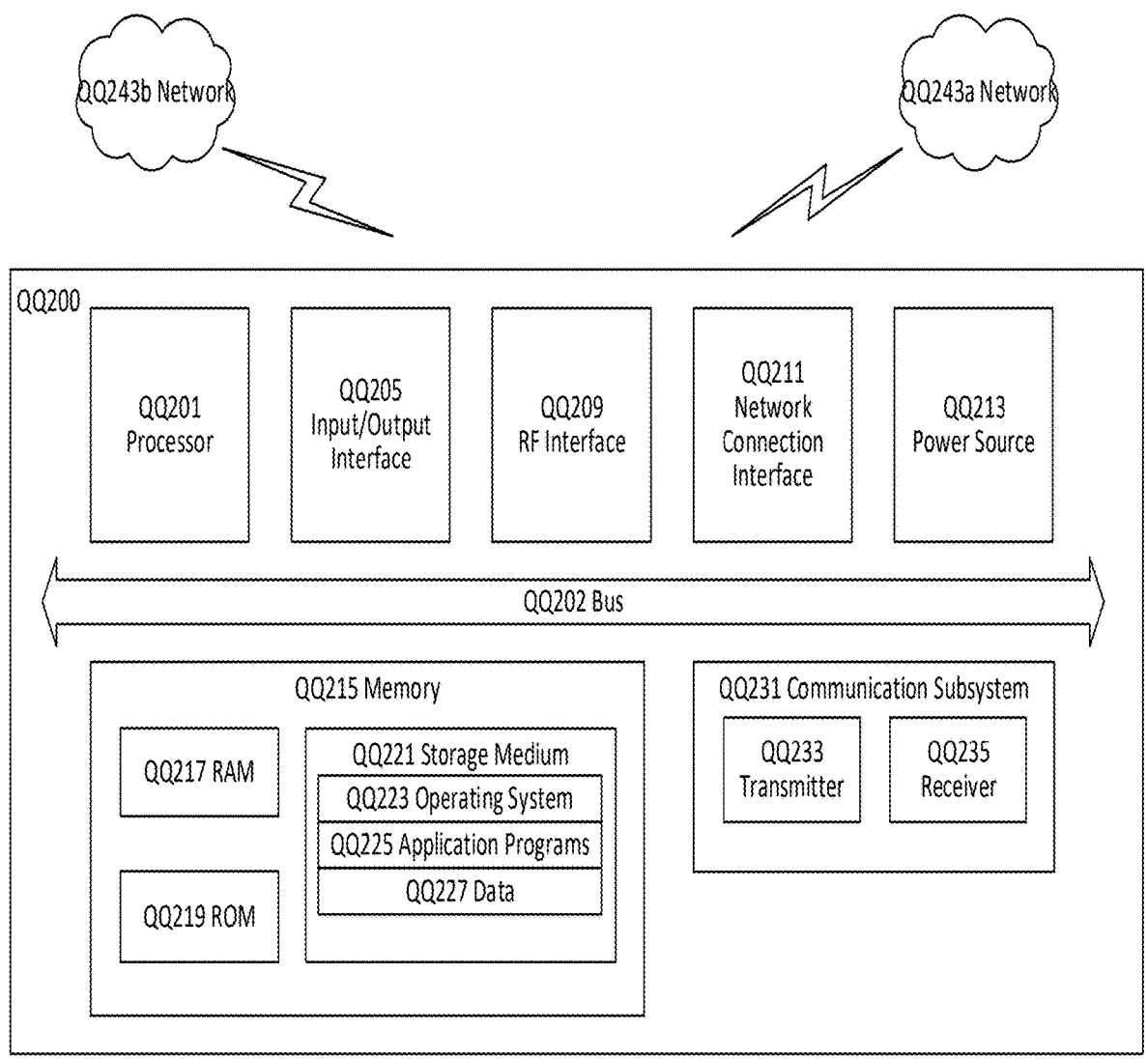
FIG. 12 schematically illustrates an embodiment of a UE.

FIG. 12. User Equipment in Accordance with Some Embodiments

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 13:
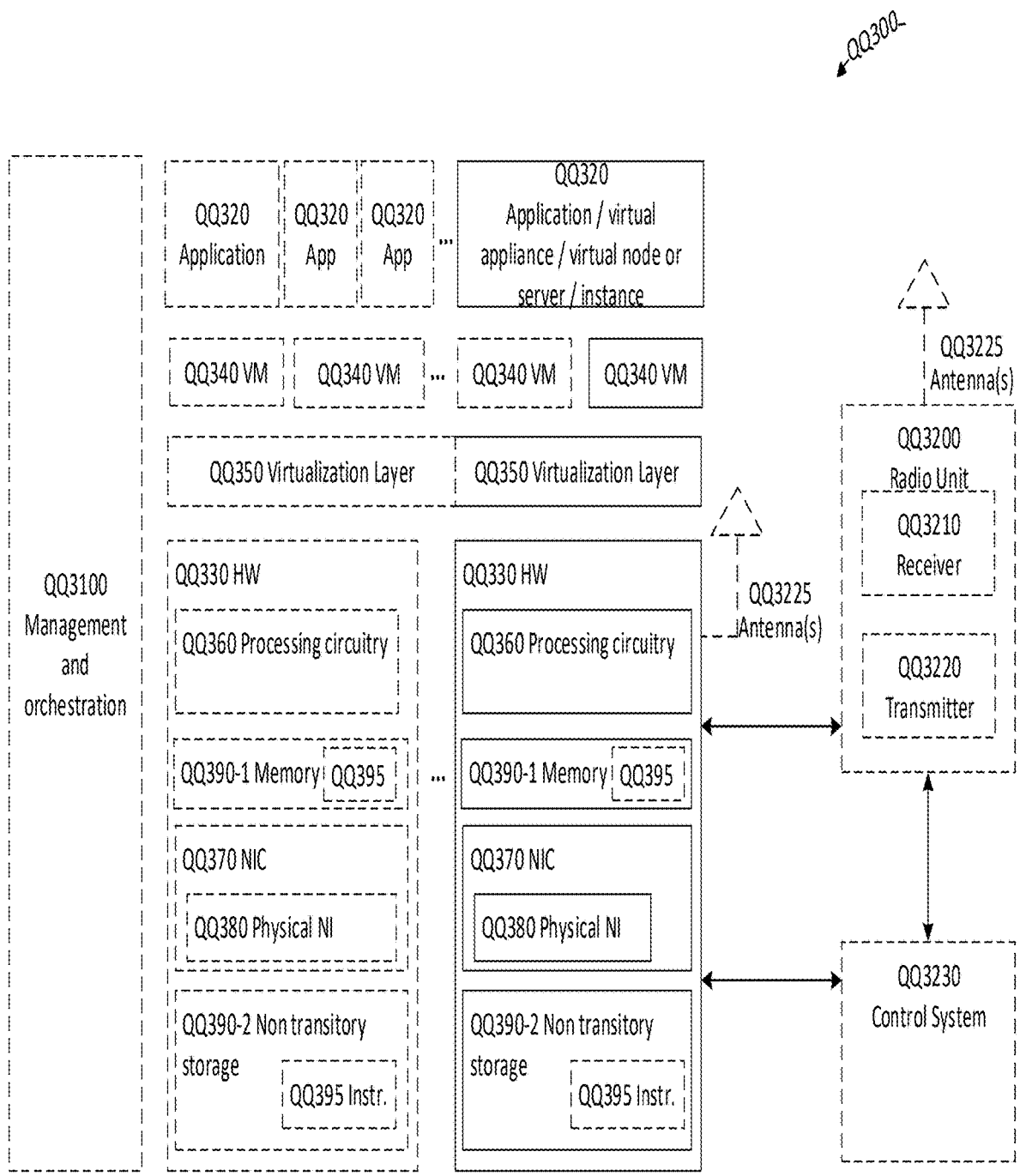
FIG. 13 is a schematic block diagram illustrating an embodiment of a virtualization environment.

FIG. 13. Virtualization Environment in Accordance with Some Embodiments

FIG. 13 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 13, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. QQ3.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 14:
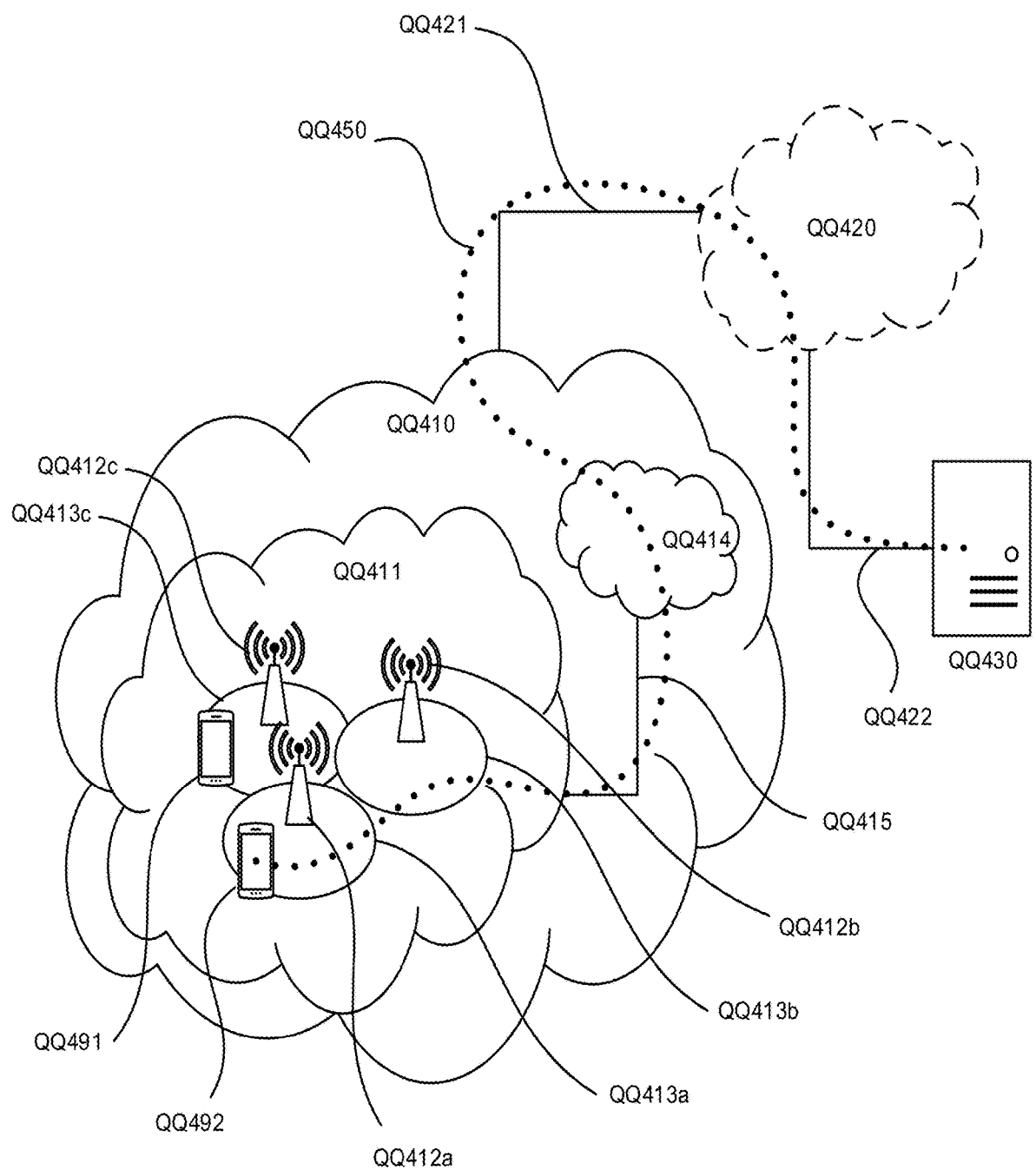
FIG. 14 schematically illustrates an embodiment of a communication system including telecommunication network.

FIG. 14. Telecommunication Network Connected Via an Intermediate Network to a Host Computer in Accordance with Some Embodiments With reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 15:
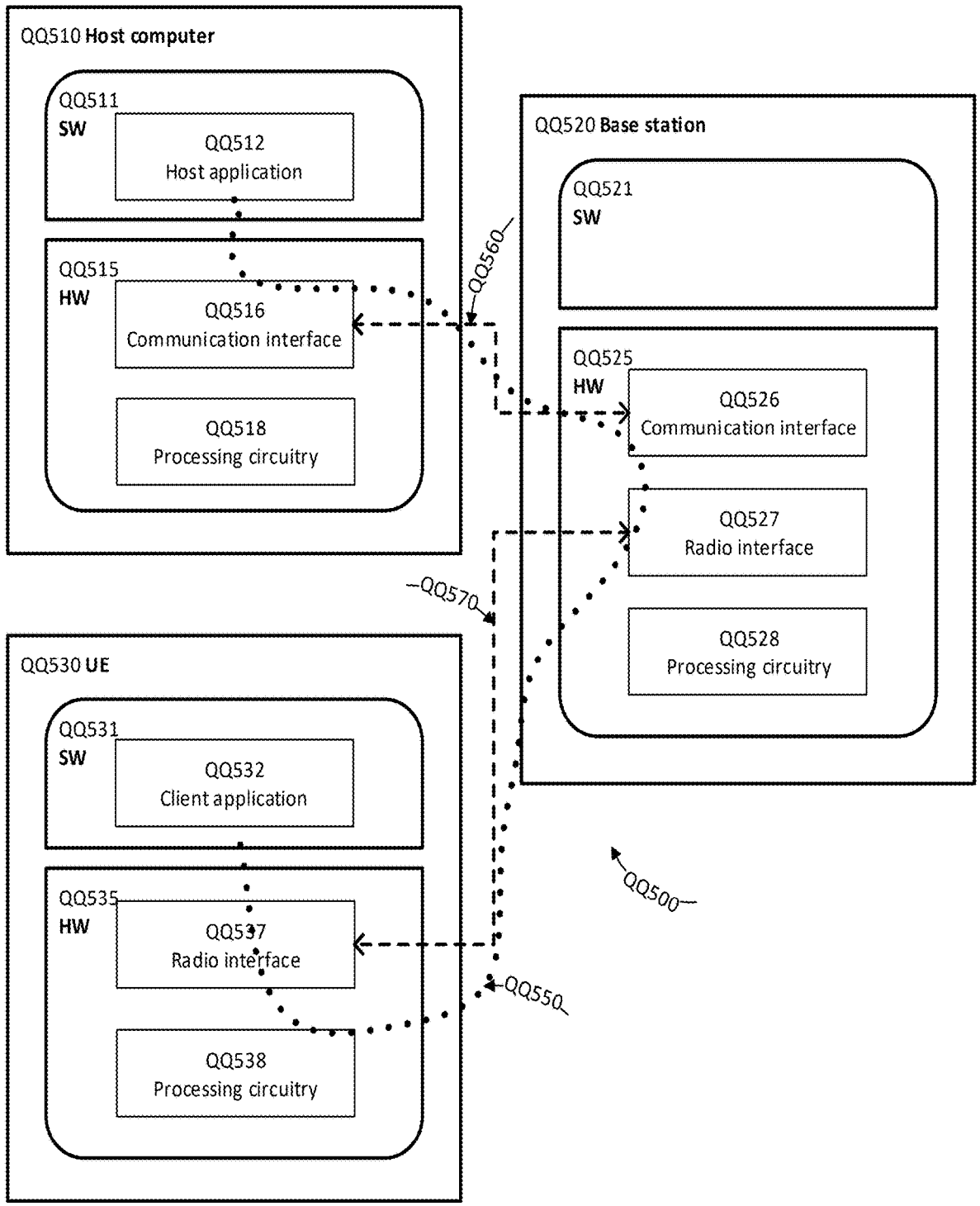
FIG. 15 schematically illustrates example implementations, in accordance with an embodiment, of the UE, base station and host computer.

FIG. 15. Host Computer Communicating Via a Base Station with a User Equipment Over a Partially Wireless Connection in Accordance with Some Embodiments Example implementations, in accordance with an embodiment, of the UE, base station and host computer discussed in the preceding paragraphs will now be described with reference to FIG. 15. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520. Communication interface QQ526 may be configured to facilitate connection QQ560 to host computer QQ510. Connection QQ560 may be direct or it may pass through a core network (not shown in FIG. 15) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 15 may be similar or identical to host computer QQ430, one of base stations QQ412a, QQ412b, QQ412c and one of UEs QQ491, QQ492 of FIG. 14, respectively. This is to say, the inner workings of these entities may be as shown in FIG. 15 and independently, the surrounding network topology may be that of FIG. 14.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the datarate and reduce latency and thereby provide benefits such as reduced user waiting time, better responsiveness and thus improved user experience.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figures 16, 17:
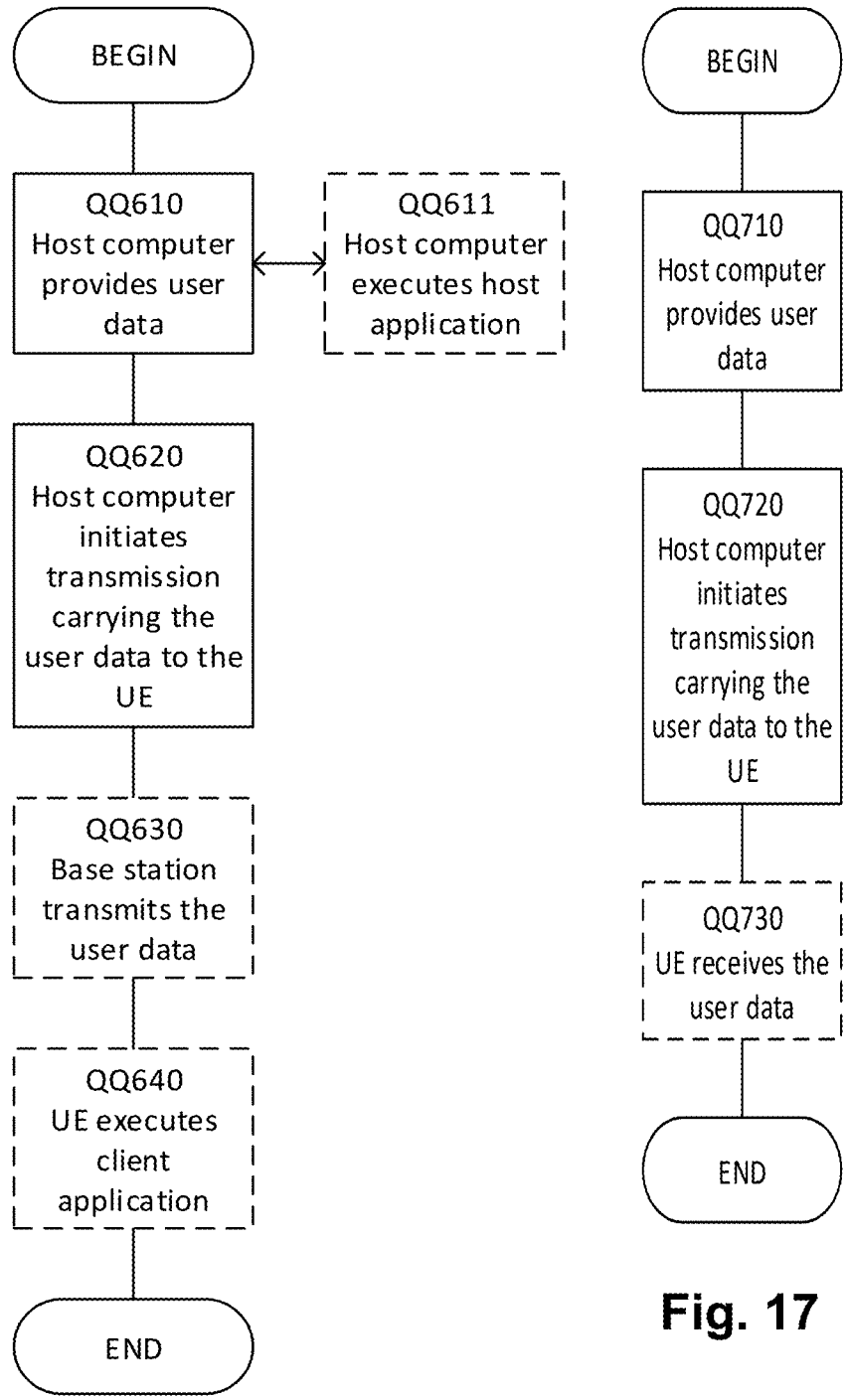
FIG. 16 is a flowchart illustrating embodiments of a method implemented in a communication system.
FIG. 17 is a flowchart illustrating embodiments of a method implemented in a communication system.

FIG. 16. Methods Implemented in a Communication System Including a Host Computer, a Base Station and a User Equipment in Accordance with Some Embodiments FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 17. Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figures 18, 19:
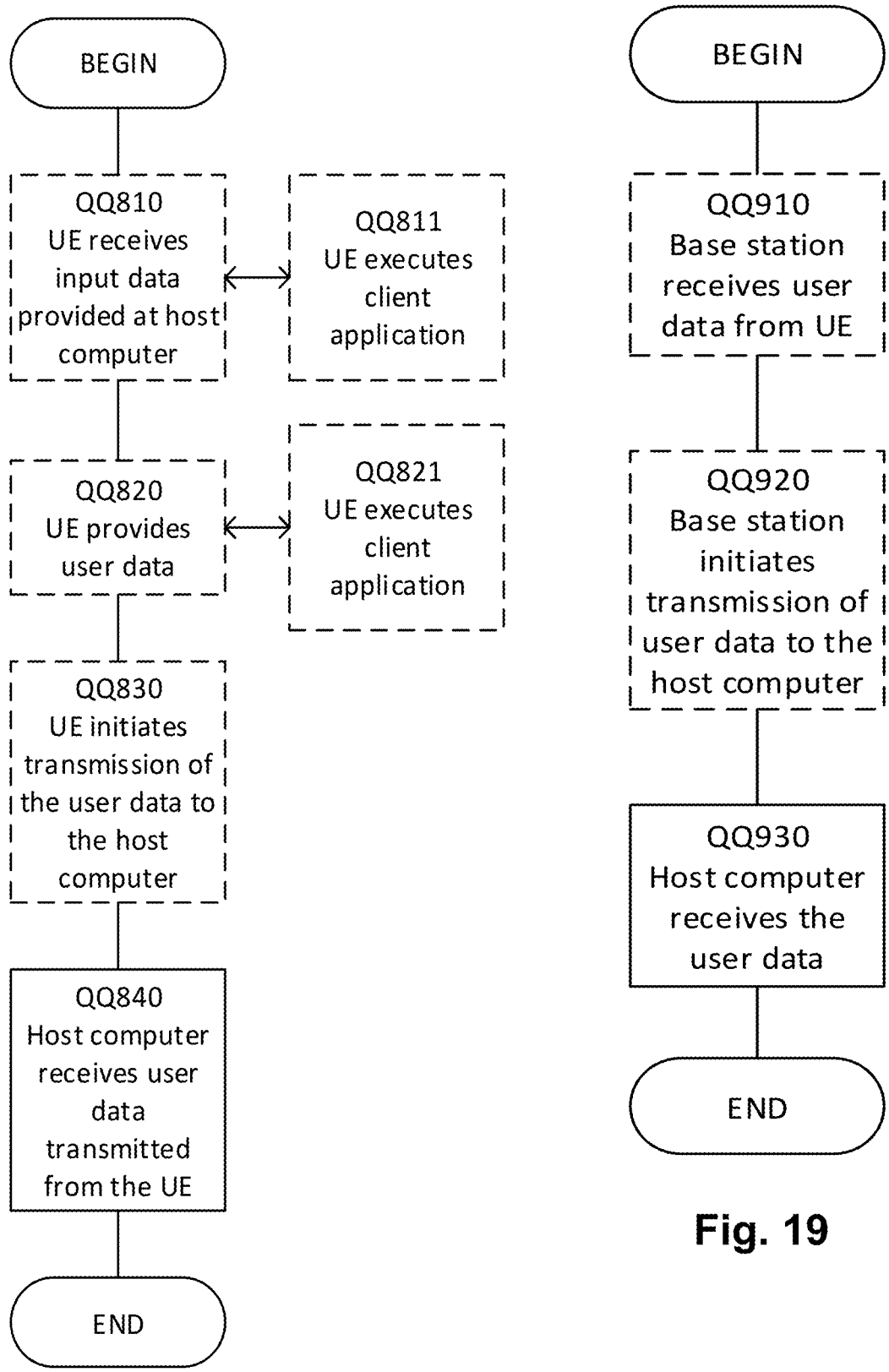
FIG. 18 is a flowchart illustrating embodiments of a method implemented in a communication system.
FIG. 19 is a flowchart illustrating embodiments of a method implemented in a communication system.

FIG. 18. Methods Implemented in a Communication System Including a Host Computer, a Base Station and a User Equipment in Accordance with Some Embodiments FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 19. Methods Implemented in a Communication System Including a Host Computer, a Base Station and a User Equipment in Accordance with Some Embodiments FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 20:
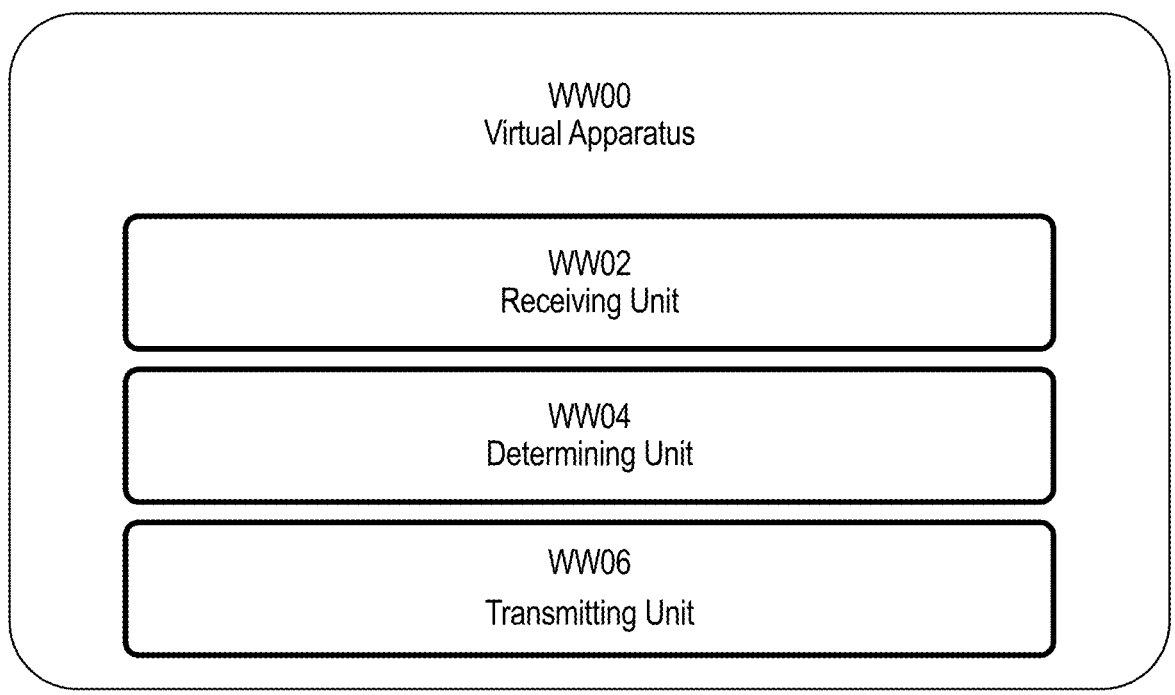
FIG. 20 schematically illustrates a schematic block diagram of embodiments of an apparatus in a wireless network.

FIG. 20: Virtualization Apparatus in Accordance with Some Embodiments

FIG. 20 illustrates a schematic block diagram of an apparatus WW00 in a wireless network (for example, the wireless network shown in FIG. 11). The apparatus may be implemented in a wireless device (e.g., wireless device QQ110 shown in FIG. 11). Alternatively, the apparatus may be implemented in a radio network node (e.g., radio network node QQ160 shown in FIG. 11). Apparatus WW00 is operable to carry out any of the example methods described with reference to FIGS. 4 and 5, and possibly any other processes or methods disclosed herein. It is also to be understood that the methods of FIGS. 4 and 5 are not necessarily carried out solely by apparatus WW00. At least some operations of the method can be performed by one or more other entities.

Virtual Apparatus WW00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit WW2, determining unit WW04, and transmitting unit WW06 and any other suitable units of apparatus WW00 to perform corresponding functions according one or more embodiments of the present disclosure.

As illustrated in FIG. 20, apparatus WW00 includes receiving unit WW02 configured to receive, or acquire, system information related to 5G (NR) coverage, or capabilities, in said cell in response to leaving, or exiting, a connected mode. Apparatus WW00 further comprises determining unit WW04 configured to determine, based on said acquired system information, whether 5G capabilities are provided in said cell. Apparatus WW00 further comprises transmitting, or indicating, unit WW06 configured to indicate, to upper layers, whether the UE is within a cell that offers 5G capabilities.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Aspects

According to a first aspect, there is provided a method implemented, or performed, by a User Equipment (UE) in dual connected mode, for determining and transmitting an UpLink (UL) Packet Data Convergence Protocol (PDCP) delay. The UE is connected to at least two radio network nodes.

The method comprises determining the delay. The determined delay is associated with each of the radio network nodes to which the UE is connected. The method further comprises transmitting, to at least one of the radio network nodes, the determined delay.

In some embodiments, the method further comprises determining a number of packets sent to each radio network node to which the UE is connected. The method may further comprise determining a percentage of packets sent to each radio network node to which the UE is connected. The packets may, for example, be distinguished depending on an associated RLC mode and if, and which, ROHC profile is applied.

In some embodiments, the method further comprises transmitting, to at least one of the radio network nodes to which the UE is connected, the determined percentage of packets sent to each radio network node. The determined percentage of packets sent to each radio network node may be transmitted together with the determined delay.

In some embodiments, the method further comprises obtaining, or receiving, information regarding packets sent to the radio network nodes to which the UE is connected. The obtained information may comprise at least one of: a total fractional time duration of a measurement period while PDCP duplication was active; a total number of packets sent to each radio network node while PDCP duplication was active; a total fractional time duration of a measurement period while PDCP duplication was inactive; and a total number of packets sent to each radio network node while PDCP duplication was inactive.

In some embodiments, the obtained information comprises information related to an associated Radio Link Control (RLC) mode and if, and which, Robust Header Compression (ROHC), profile are being used for the packets.

In some embodiments, the determined delay is determined based on the obtained information regarding packets sent to the radio network nodes.

In some embodiments, determining the delay comprises determining an average delay for the at least two radio network nodes to which the UE is connected. The average delay may be a weighted average delay.

In some embodiments, the average delay is determined according to the formula $$\frac{N_{Dup} * D_{Best} + N_{NonDupMN} * D_{MN} + N_{NonDupSN} * D_{SN}}{N_{Dup} + N_{NonDupMN} + N_{NonDupSN}},$$

wherein $N_{Dup}$ is a number of packets duplicated to both radio network nodes during a measurement period, wherein $D_{Best}$ is a minimum of an average delay experienced on a Master Node, MN, and the average delay experienced on an Secondary Node, SN, wherein $N_{NonDupMN}$ is the number of packets sent to MN when PDCP duplication is not enabled during the measurement period, wherein $D_{MN}$ is the average delay experienced by the packets sent to the MN during the measurement period, wherein $N_{NonDupSN}$ is the number of packets sent to SN when the PDCP duplication is not enabled during the measurement period and wherein $D_{SN}$ is the average delay experienced by the packets sent to the SN during the measurement period.

In some embodiments the average delay is determined according to the formula $$\frac{T_{Dup} * D_{Best} + T_{NonDup} * D_{Avg}}{T_{Dup} + T_{NonDup}},$$

wherein $T_{Dup}$ is the time duration during which the packets were duplicated to both MN and SN during the measurement period, wherein $D_{Best}$ is the minimum of the average delay experienced to the MN and the average delay experienced to the SN, wherein $T_{NonDup}$ is the time duration during which the packets were sent to MN or to the SN and the PDCP duplication is not enabled during the measurement period, wherein $D_{Avg}$ is the average delay experienced by the packets sent to the MN or SN during the measurement period, wherein $N_{NonDupMN}$ is the number of packets sent to MN when the PDCP duplication is not enabled during the measurement period, wherein $D_{MN}$ is the average delay experienced by the packets sent to the MN during the measurement period, wherein $N_{NonDupSN}$ is the number of packets sent to SN when the PDCP duplication is not enabled during the measurement period, and wherein $D_{SN}$ is the average delay experienced by the packets sent to the SN during the measurement period the average delay experienced by the packets sent to the SN during the measurement period.

In some embodiments, the method further comprises receiving a delay-determining configuration from at least one of the radio network nodes to which the UE is connected. The delay-determining configuration configures delay measurements.

In some embodiments, the determined delay is transmitted to each of the radio network nodes to which the UE is connected.

In some embodiments, the determined delay is transmitted to one of the radio network nodes to which the UE is connected.

In some embodiments, the determined delay is transmitted in a message.

In some embodiments, the determined delay is a D1 value.

According to a second aspect, there is provided a method performed, or implemented, by a radio network node for handling an UL PDCP delay between radio network nodes and a UE in dual connected mode. The UE is connected to at least two radio network nodes.

The method comprises receiving at least one delay determined by the UE. The received at least one delay is associated with each of the radio network nodes to which the UE is connected. The method further comprises obtaining a percentage of packets received through each leg of the radio network nodes.

In some embodiments, the method further comprises transmitting, to the other radio network node to which the UE is connected, the received at least one delay determined by the UE.

In some embodiments, obtaining the percentage of packets received through each leg of the radio network nodes comprises receiving, from the other radio network node to which the UE is connected, the percentage of packets received through each leg of the radio network nodes.

In some embodiments, obtaining the percentage of packets received through each leg of the radio network node comprises determining the percentage of packets received through each leg of the radio network nodes. The method may further comprise transmitting, to the other radio network node to which the UE is connected, the determined percentage of packets received through each leg of the radio network nodes.

In some embodiments, the packets are distinguished depending on an associated RLC mode and if, and which, ROHC profile is applied.

In some embodiments, the method further comprises determining, based on the received delay determined by the UE and the obtained percentage of packets received through each leg, whether to perform any updates regarding the leg.

In some embodiments, the received at least one delay determined by the UE is received from the UE.

In some embodiments, the received at least one delay determined by the UE is received from the other radio network node to which the UE is connected.

In some embodiments, the received at least one delay is an average delay for the at least two radio network nodes to which the UE is connected. The average delay may be a weighted average delay.

In some embodiments, the method further comprises transmitting a delay-determining configuration to the UE, wherein the delay-determining configuration configures delay measurements.

According to a third aspect of the present disclosure, there is provided a UE in dual connected mode configured to perform the method according to the first aspect. The UE is connected to at least two radio network nodes.

The UE is configured to determining and transmitting an UL PDCP delay. The UE is configured to determine the delay. The determined delay is associated with each of the radio network nodes to which the UE is connected. The UE is further configured to transmit, to at least one of the radio network nodes, the determined delay.

According to a fourth aspect of the present disclosure, there is provided a radio network node configured to perform the method according to the second aspect. The UE is connected to at least two radio network nodes.

The radio network node is configured to handling an UL PDCP delay between radio network nodes and a UE in dual connected mode. The radio network node is configured to receive at least one delay, which is determined by the UE. The received at least one delay is associated with each of the radio network nodes to which the UE is connected. The radio network node is further configured to obtain a percentage of packets received through each leg of the radio network nodes.

According to a fifth aspect of the present disclosure, there is provided a computer program comprising instructions, which when executed by a processor, causes the processor to perform actions according to any of the methods according to the first and the second aspect.

According to a sixth aspect of the present disclosure, the object is achieved by a carrier comprising the computer program of the fifth aspect, wherein the carrier is one of an electronic signal, an optical signal, an electromagnetic signal, a magnetic signal, an electric signal, a radio signal, a microwave signal, or a computer-readable storage medium.

EMBODIMENTS

Group A Embodiments

1. A method, performed by a User Equipment, UE, in dual connected mode, for determining and transmitting an UpLink, UL, Packet Data Convergence Protocol, PDCP, delay, wherein the UE is connected to at least two radio network nodes and wherein the method comprises:
determining the delay, wherein the determined delay is associated with each of the radio network nodes to which the UE is connected, and
transmitting, to at least one of the radio network nodes, the determined delay.

2. The method of embodiment 1, wherein the method further comprises:
determining a percentage of packets sent to each radio network node to which the UE is connected.

3. The method of embodiment 2, wherein the packets are distinguished depending on an associated RLC mode and if, and which, ROHC profile is applied.

4. The method of any of embodiments 2 and 3, wherein the method further comprises:
transmitting, to at least one of the radio network nodes to which the UE is connected, the determined percentage of packets sent to each radio network node.

5. The method of embodiment 4, wherein the determined percentage of packets sent to each radio network node is transmitted together with the determined delay.

6. The method of any of the previous embodiments, wherein the method further comprises:
obtaining information regarding packets sent to the radio network nodes to which the UE is connected.

7. The method of embodiment 6, wherein the obtained information comprises at least 30 one of:
a total fractional time duration of a measurement period while PDCP duplication was active;
a total number of packets sent to each radio network node while PDCP duplication was active;
a total fractional time duration of a measurement period while PDCP duplication was inactive; and
a total number of packets sent to each radio network node while PDCP duplication was inactive.

8. The method of any of embodiments 6 and 7, wherein the obtained information comprises information related to an associated Radio Link Control, RLC, mode and if, and which, Robust Header Compression, ROHC, profile are being used for the packets.

9. The method of any of the embodiments 6 to 8, wherein the determined delay is determined based on the obtained information regarding packets sent to the radio network nodes.

10. The method of any of the previous embodiments, wherein determining the delay comprises:
determining an average delay for the at least two radio network nodes to which the UE is connected.

11. The method of embodiment 10, wherein the average delay is a weighted average delay.

12. The method of any of the embodiments 10 and 11, wherein the average delay is determined according to the formula $$\frac{N_{Dup} * D_{Best} + N_{NonDupMN} * D_{MN} + N_{NonDupSN} * D_{SN}}{N_{Dup} + N_{NonDupMN} + N_{NonDupSN}},$$

wherein $N_{Dup}$ is a number of packets duplicated to both radio network nodes during a measurement period, wherein $D_{Best}$ is a minimum of an average delay experienced on a Master Node, MN, and the average delay experienced on an Secondary Node, SN, wherein $N_{NonDupMN}$ is the number of packets sent to MN when PDCP duplication is not enabled during the measurement period, wherein $D_{MN}$ is the average delay experienced by the packets sent to the MN during the measurement period, wherein $N_{NonDupSN}$ is the number of packets sent to SN when the PDCP duplication is not enabled during the measurement period and wherein $D_{SN}$ is the average delay experienced by the packets sent to the SN during the measurement period.

13. The method of any of the embodiments 10 and 11, wherein the average delay is determined according to the formula $$\frac{T_{Dup} * D_{Best} + T_{NonDup} * D_{Avg}}{T_{Dup} + T_{NonDup}},$$

wherein $T_{Dup}$ is the time duration during which the packets were duplicated to both MN and SN during the measurement period, wherein $D_{Best}$ is the minimum of the average delay experienced to the MN and the average delay experienced to the SN, wherein $T_{NonDup}$ is the time duration during which the packets were sent to MN or to the SN and the PDCP duplication is not enabled during the measurement period, wherein $D_{Avg}$ is the average delay experienced by the packets sent to the MN or SN during the measurement period, wherein $N_{NonDupMN}$ is the number of packets sent to MN when the PDCP duplication is not enabled during the measurement period, wherein $D_{MN}$ is the average delay experienced by the packets sent to the MN during the measurement period, wherein $N_{NonDupSN}$ is the number of packets sent to SN when the PDCP duplication is not enabled during the measurement period, and wherein $D_{SN}$ is the average delay experienced by the packets sent to the SN during the measurement period the average delay experienced by the packets sent to the SN during the measurement period.

14. The method of any of the previous embodiments, wherein the method further comprises:
receiving a delay-determining configuration from at least one of the radio network nodes to which the UE is connected, wherein the delay-determining configuration configures delay measurements.

15. The method of any of the previous embodiments, wherein the determined delay is transmitted to each of the radio network nodes to which the UE is connected.

16. The method of any of the embodiments 1 to 14, wherein the determined delay is transmitted to one of the radio network nodes to which the UE is connected.

17. The method of any of the previous embodiments, wherein the determined delay is transmitted in a message.

18. The method of any of the previous embodiments, wherein the determined delay is a D1 value.

Group B Embodiments

1. A method, performed by a radio network node for handling an UpLink, UL, Packet Data Convergence Protocol, PDCP, delay between radio network nodes and a User Equipment, UE, in dual connected mode, wherein the UE is connected to at least two radio network nodes and wherein the method comprises:
   receiving at least one delay determined by the UE, wherein the at least one received delay is associated with each of the radio network nodes to which the UE is connected; and
   obtaining a percentage of packets received through each leg of the radio network nodes.

2. The method of embodiment 1, wherein the method further comprises:
   transmitting, to the other radio network node to which the UE is connected, the received at least one delay determined by the UE.

3. The method of any of the embodiments 1 and 2, wherein obtaining the percentage of packets received through each leg of the radio network nodes comprises:
   receiving, from the other radio network node to which the UE is connected, the percentage of packets received through each leg of the radio network nodes.

4. The method of any of the embodiments 1 and 2, wherein obtaining the percentage of packets received through each leg of the radio network node comprises:
   determining the percentage of packets received through each leg of the radio network nodes.

5. The method of embodiment 4, wherein the method further comprises:
   transmitting, to the other radio network node to which the UE is connected, the determined percentage of packets received through each leg of the radio network nodes.

6. The method of any of the embodiments 4 and 5, wherein the packets are distinguished depending on an associated RLC mode and if, and which, ROHC profile is applied.

7. The method of any of the embodiments 1 to 6, wherein the method further comprises:
   determining, based on the received at least one delay determined by the UE and the obtained percentage of packets received through each leg, whether to perform any updates regarding the leg.

8. The method of any of embodiments 1 to 7, wherein the received at least one delay determined by the UE is received from the UE.

9. The method of embodiments 1 to 8, wherein the received at least one delay determined by the UE is received from the other radio network node to which the UE is connected.

10. The method of any of the previous embodiments, wherein the received at least one delay is an average delay for the at least two radio network nodes to which the UE is connected.

11. The method of embodiment 10, wherein the average delay is a weighted average delay.

12. The method of any of the previous embodiments, wherein the method further comprises:
   transmitting a delay-determining configuration to the UE, wherein the delay-determining configuration configures delay measurements.

13. The method of any of the previous embodiments, wherein the received at least 25 one delay determined by the UE is a D1 measurement value.

Group C Embodiments

1. A User Equipment, UE, in dual connected mode, for determining and transmitting an UpLink, UL, Packet Data Convergence Protocol, PDCP, delay, wherein the 30 UE is connected to at least two radio network nodes, the UE comprising:
   processing circuitry configured to perform any of the steps of any of the Group A embodiments; and
   power supply circuitry configured to supply power to the wireless device.

2. A radio network node for handling an UpLink, UL, Packet Data Convergence Protocol, PDCP, delay between the radio network node and a User Equipment, UE, in dual connected mode, wherein the UE is connected to at least two radio network nodes, the radio network node comprising:
   processing circuitry configured to perform any of the steps of any of the Group B embodiments;
   power supply circuitry configured to supply power to the radio network node.

3. A user equipment (UE) in dual connected mode, for determining and transmitting an UpLink, UL, Packet Data Convergence Protocol, PDCP, delay, wherein the UE is connected to at least two radio network nodes, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.

4. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the radio network node's processing circuitry configured to perform any of the steps of any of the Group B embodiments.

5. The communication system of the previous embodiment further including the radio network node.

6. The communication system of the previous 2 embodiments, further including the UE, wherein the UE is configured to communicate with the radio network node.

7. The communication system of the previous 3 embodiments, wherein:
the processing circuitry of the host computer is configured to execute a host application, thereby providing the user data; and
the UE comprises processing circuitry configured to execute a client application associated with the host application.

8. A method implemented in a communication system including a host computer, a radio network node and a user equipment (UE), the method comprising:
at the host computer, providing user data; and
at the host computer, initiating a transmission carrying the user data to the UE via a cellular network comprising the radio network node, wherein radio network node performs any of the steps of any of the Group B embodiments.

9. The method of the previous embodiment, further comprising, at the radio network node, transmitting the user data.

10. The method of the previous 2 embodiments, wherein the user data is provided at the host computer by executing a host application, the method further comprising, at the UE, executing a client application associated with the host application.

11. A user equipment (UE) configured to communicate with a radio network node, the UE comprising a radio interface and processing circuitry configured to performs the of the previous 3 embodiments.

12. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

13. The communication system of the previous embodiment, wherein the cellular network further includes a radio network node configured to communicate with the UE.

14. The communication system of the previous 2 embodiments, wherein:
the processing circuitry of the host computer is configured to execute a host application, thereby providing the user data; and
the UE's processing circuitry is configured to execute a client application associated with the host application.

15. A method implemented in a communication system including a host computer, a radio network node and a user equipment (UE), the method comprising:
at the host computer, providing user data; and
at the host computer, initiating a transmission carrying the user data to the UE via a cellular network comprising the radio network node, wherein the UE performs any of the steps of any of the Group A embodiments.

16. The method of the previous embodiment, further comprising at the UE, receiving the user data from the radio network node.

17. A communication system including a host computer comprising:
communication interface configured to receive user data originating from a transmission from a user equipment (UE) to a radio network node,
wherein the UE comprises a radio interface and processing circuitry, the UE's processing circuitry configured to perform any of the steps of any of the Group A embodiments.

18. The communication system of the previous embodiment, further including the UE.

19. The communication system of the previous 2 embodiments, further including 30 the radio network node, wherein the radio network node comprises a radio interface configured to communicate with the UE and a communication interface configured to forward to the host computer the user data carried by a transmission from the UE to the radio network node.

20. The communication system of the previous 3 embodiments, wherein:
the processing circuitry of the host computer is configured to execute a host application; and
the UE's processing circuitry is configured to execute a client application associated with the host application, thereby providing the user data.

21. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

22. A method implemented in a communication system including a host computer, a radio network node and a user equipment (UE), the method comprising:
at the host computer, receiving user data transmitted to the radio network node from the UE, wherein the UE performs any of the steps of any of the Group A embodiments.

23. The method of the previous embodiment, further comprising, at the UE, providing the user data to the radio network node.

24. The method of the previous 2 embodiments, further comprising:
at the UE, executing a client application, thereby providing the user data to be transmitted; and
at the host computer, executing a host application associated with the client application.

25. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

26. A communication system including a host computer comprising a communication interface configured to receive user data originating from a transmission from a user equipment (UE) to a radio network node, wherein the radio network node comprises a radio interface and processing circuitry, the radio network node's processing circuitry configured to perform any of the steps of any of the Group B embodiments.

27. The communication system of the previous embodiment further including the radio network node n.

28. The communication system of the previous 2 embodiments, further including the UE, wherein the UE is configured to communicate with the radio network node.

29. The communication system of the previous 3 embodiments, wherein:
the processing circuitry of the host computer is configured to execute a host application;
the UE is configured to execute a client application associated with the host application, thereby providing the user data to be received by the host computer.

30. A method implemented in a communication system including a host computer, a radio network node and a user equipment (UE), the method comprising:
at the host computer, receiving, from the radio network node, user data originating from a transmission which the base station has received from the UE, wherein the UE performs any of the steps of any of the Group A embodiments.

30. The method of the previous embodiment, further comprising at the radio network node, receiving the user data from the UE.

31. The method of the previous 2 embodiments, further comprising at the radio network node, initiating a transmission of the received user data to the host computer.

REFERENCES 1. 3GPP R2-2007770-Discussion on MDT enhancements, Huawei, RAN2 111_e meeting, 17-28 Aug. 2020

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

| Abbreviation | Explanation |
|---|---|
| CA | Carrier Aggregation |
| DRB | Dedicated Radio Bearer |
| EUTRA | Evolved Universal Terrestrial Radio Access |
| LBT | Listen Before Talk |
| LTE | Long Term Evolution |
| MAC | Medium Access Control |
| MCG | Master Cell Group |
| MDT | Minimization of Driving Test |
| MN | Master Node |
| NR | New Radio |
| RAN | Radio Access Network |
| RAT | Radio Access Technology |
| RLC | Radio Link Control |
| RLF | Radio Link Failure |
| RRC | Radio Resource Control |
| SN | Secondary Node |
| UE | User Equipment |

The invention claimed is:

1. A method performed by a User Equipment (UE), wherein the UE is connected to at least two radio network nodes and wherein the method comprises:
determining an Uplink (UL) Packet Data Convergence Protocol (PDCP) the delay with respect to UL packets transmitted by the UE during a measurement period, on connections between the UE and the at least two radio network nodes;
determining percentages of the UL packets sent on each connection; and
sending a report indicating the determined UL PDCP delay and the determined percentages to at least one of the radio network nodes to which the UE is connected.

2. The method of claim 1, wherein the UE further reports Radio Link Control (RLC) mode information associated with UL packet transmissions on each connection, for the measurement period.

3. The method of claim 1, wherein the UE further reports whether Robust Header Compression (RoHC) was enabled for UL packet transmissions on each connection, during the measurement period, including reporting RoHC profile information.

4. The method of claim 1, wherein, with respect to the measurement period, the UE further reports at least one of:
a total fractional time duration of the measurement period while PDCP duplication was active;
a total number of packets sent to each radio network node while PDCP duplication was active;
a total fractional time duration of the measurement period while PDCP duplication was inactive; and
a total number of packets sent to each radio network node while PDCP duplication was inactive.

5. The method of claim 1, wherein determining the UL PDCP delay comprises:
determining an average UL PDCP delay for the at least two radio network nodes to which the UE is connected.

6. The method of claim 1, wherein the method further comprises:
receiving a delay-determining configuration from at least one of the radio network nodes to which the UE is connected, wherein the delay-determining configuration configures delay measurements used by the UE for determining the UL PDCP delay.

7. The method of claim 1, wherein the determined UL PDCP delay is transmitted to any one out of:
each of the radio network nodes to which the UE is connected, or
one of the radio network nodes to which the UE is connected.

8. The method of claim 1, wherein the determined UL PDCP delay is a D1 value.

9. A method performed by a radio network node, wherein the radio network node is in a split bearer configuration where the radio network node is one among at least two radio network nodes connected to a user equipment (UE) and wherein the method comprises:
receiving reporting from the UE indicating an Uplink (UL) Packet Data Convergence Protocol (PDCP) delay determined by the UE with respect to UL packets transmitted by the UE during a measurement period, on connections between the UE and the at least two radio network node, and wherein the reporting further indicates percentages of the UL packets sent on each connection; and
managing the split-bearer configuration in dependence on the received reporting.

10. The method of claim 9, wherein the radio network node is one of two radio network nodes in Dual Connectivity (DC) with the UE, and wherein managing the split-bearer configuration comprises deciding whether to keep both connections or drop one of the two connection.

11. A User Equipment (UE) configured for operation with a radio network, the UE comprising:
radio transceiver circuitry configured for wirelessly connecting to radio network nodes of the radio network; and
processing circuitry configured to:
determine an Uplink (UL) Packet Data Convergence Protocol (PDCP) delay with respect to UL packets transmitted by the UE during a measurement period, on connections between the UE and at least two radio network nodes;

determine percentages of the UL packets sent on each connection; and send, via the radio transceiver circuitry, a report to at least one of the radio network nodes to which the UE is connected, the report indicating the determined UL PDCP delay and the determined percentages.

12. A radio network node for operation in a radio network, the radio network node comprising:

radio transceiver circuitry for wirelessly connecting to a user equipment (UE); and processing circuitry that is configured to, with respect to a split-bearer configuration in which the radio network node is one among at least two radio network nodes connected to the UE:

receive reporting from the UE indicating an Uplink (UL) Packet Data Convergence Protocol (PDCP) delay determined by the UE with respect to UL packets transmitted by the UE during a measurement period, on connections between the UE and the at least two radio network nodes, the reporting further indicating percentages of the UL packets sent on each connection; and manage the split bearer configuration in dependence on the received reporting.

* * * * *